(12) United States Patent
Laramie et al.

(10) Patent No.: US 10,879,527 B2
(45) Date of Patent: Dec. 29, 2020

(54) PROTECTIVE LAYERS FOR ELECTRODES AND ELECTROCHEMICAL CELLS

(71) Applicant: Sion Power Corporation, Tucson, AZ (US)

(72) Inventors: Michael G. Laramie, Tucson, AZ (US); Yuriy V. Mikhaylik, Tucson, AZ (US); Hui Du, Tucson, AZ (US); Joern Kulisch, Eppelheim (DE); Marina Safont-Sempere, Ludwigshafen (DE); Klaus Leitner, Ludwigshafen (DE); Holger Schneider, Ludwigshafen (DE)

(73) Assignee: Sion Power Corporation, Tucson, AZ (US)

( * ) Notice: Subject to any disclaimer, the term of this patent is extended or adjusted under 35 U.S.C. 154(b) by 205 days.

(21) Appl. No.: 15/599,595

(22) Filed: May 19, 2017

(65) Prior Publication Data

US 2017/0338475 A1 Nov. 23, 2017

Related U.S. Application Data

(60) Provisional application No. 62/339,340, filed on May 20, 2016.

(51) Int. Cl.
*H01M 10/0525* (2010.01)
*H01M 4/36* (2006.01)
(Continued)

(52) U.S. Cl.
CPC ........... *H01M 4/366* (2013.01); *H01M 2/145* (2013.01); *H01M 2/1646* (2013.01);
(Continued)

(58) Field of Classification Search
CPC .... H01M 4/366; H01M 2/1646; H01M 2/145; H01M 4/139; H01M 10/4235;
(Continued)

(56) References Cited

U.S. PATENT DOCUMENTS

| 4,664,991 A | 5/1987 | Perichaud et al. |
| 4,739,018 A | 4/1988 | Armand et al. |

(Continued)

FOREIGN PATENT DOCUMENTS

| EP | 2 744 028 A1 | 6/2014 |
| JP | S61-208750 A | 9/1986 |

(Continued)

OTHER PUBLICATIONS

English machine translation of Nobuo JP2008-234843 (Year: 2008).*
(Continued)

*Primary Examiner* — Lisa S Park
(74) *Attorney, Agent, or Firm* — Wolf, Greenfield & Sacks, P.C.

(57) ABSTRACT

Articles and methods including layers for protection of electrodes in electrochemical cells are provided. As described herein, a layer, such as a protective layer for an electrode, may comprise a plurality of particles (e.g., crystalline inorganic particles, amorphous inorganic particles). In some aspects, at least a portion of the plurality of particles (e.g., inorganic particles) are fused to one another. For instance, in some aspects, the layer may be formed by aerosol deposition or another suitable process that involves subjecting the particles to a relatively high velocity such that fusion of particles occurs during deposition. In some cases, the protective layer may be porous.

25 Claims, 19 Drawing Sheets

(51) Int. Cl.
  *H01M 10/42*   (2006.01)
  *H01M 2/14*    (2006.01)
  *H01M 2/16*    (2006.01)
  *H01M 4/04*    (2006.01)
  *H01M 4/13*    (2010.01)
  *H01M 10/052*  (2010.01)
  *H01M 4/139*   (2010.01)
  *H01M 4/62*    (2006.01)
  *H01M 4/38*    (2006.01)
  *H01M 4/134*   (2010.01)

(52) U.S. Cl.
  CPC ....... *H01M 2/1686* (2013.01); *H01M 4/0419* (2013.01); *H01M 4/0471* (2013.01); *H01M 4/13* (2013.01); *H01M 4/139* (2013.01); *H01M 4/62* (2013.01); *H01M 10/052* (2013.01); *H01M 10/0525* (2013.01); *H01M 10/4235* (2013.01); *H01M 4/134* (2013.01); *H01M 4/382* (2013.01); *H01M 2220/20* (2013.01)

(58) Field of Classification Search
  CPC .. H01M 4/13; H01M 4/0471; H01M 10/0525; H01M 2/1686; H01M 4/0419; H01M 10/052; H01M 4/62; H01M 4/134; H01M 4/382; H01M 2220/20
  See application file for complete search history.

(56) References Cited

U.S. PATENT DOCUMENTS

| | | | |
|---|---|---|---|
| 4,833,048 A | 5/1989 | Dejonghe et al. | |
| 4,917,974 A | 4/1990 | De Jonghe et al. | |
| 4,954,371 A | 9/1990 | Yializis | |
| 5,162,175 A | 11/1992 | Visco et al. | |
| 5,194,341 A | 3/1993 | Bagley et al. | |
| 5,314,765 A | 5/1994 | Bates | |
| 5,324,599 A | 6/1994 | Oyama et al. | |
| 5,366,829 A | 11/1994 | Saidi | |
| 5,387,479 A | 2/1995 | Koksbang | |
| 5,415,954 A | 5/1995 | Gauthier et al. | |
| 5,434,021 A | 7/1995 | Fauteux et al. | |
| 5,441,831 A | 8/1995 | Okamoto et al. | |
| 5,460,905 A | 10/1995 | Skotheim | |
| 5,462,566 A | 10/1995 | Skotheim | |
| 5,487,959 A | 1/1996 | Koksbang | |
| 5,516,598 A | 5/1996 | Visco et al. | |
| 5,529,860 A | 6/1996 | Skotheim et al. | |
| 5,532,083 A | 7/1996 | McCullough | |
| 5,538,812 A | 7/1996 | Lee et al. | |
| 5,569,520 A | 10/1996 | Bates | |
| 5,601,947 A | 2/1997 | Skotheim et al. | |
| 5,648,187 A | 7/1997 | Skotheim | |
| 5,681,615 A | 10/1997 | Affinito et al. | |
| 5,690,702 A | 11/1997 | Skotheim et al. | |
| 5,716,736 A | 2/1998 | Zhang et al. | |
| 5,723,230 A | 3/1998 | Naoi et al. | |
| 5,731,104 A | 3/1998 | Ventura et al. | |
| 5,783,330 A | 7/1998 | Naoi et al. | |
| 5,792,575 A | 8/1998 | Naoi et al. | |
| 5,824,434 A | 10/1998 | Kawakami et al. | |
| 5,834,137 A | 11/1998 | Zhang et al. | |
| 5,882,819 A | 3/1999 | Naoi et al. | |
| 5,955,182 A * | 9/1999 | Yasuda .................. | B32B 15/04 428/217 |
| 5,961,672 A | 10/1999 | Skotheim et al. | |
| 6,025,094 A | 2/2000 | Visco et al. | |
| 6,066,417 A | 5/2000 | Cho et al. | |
| 6,117,590 A | 9/2000 | Skotheim et al. | |
| 6,153,337 A | 11/2000 | Carlson et al. | |
| 6,156,395 A | 12/2000 | Zhang et al. | |
| 6,183,901 B1 | 2/2001 | Ying et al. | |
| 6,201,100 B1 | 3/2001 | Gorkovenko et al. | |
| 6,202,591 B1 | 3/2001 | Witzman et al. | |
| 6,203,947 B1 | 3/2001 | Peled et al. | |
| 6,225,002 B1 | 5/2001 | Nimon et al. | |
| 6,268,695 B1 | 7/2001 | Affinito | |
| 6,276,355 B1 | 8/2001 | Zhang et al. | |
| 6,277,514 B1 | 8/2001 | Ying et al. | |
| 6,284,412 B1 | 9/2001 | Minakata et al. | |
| 6,328,770 B1 | 12/2001 | Gozdz | |
| 6,395,423 B1 | 5/2002 | Kawakami et al. | |
| 6,413,285 B1 | 7/2002 | Chu et al. | |
| 6,508,921 B1 | 1/2003 | Mu et al. | |
| 6,517,968 B2 | 2/2003 | Johnson et al. | |
| 6,570,325 B2 | 5/2003 | Graff et al. | |
| 6,770,187 B1 | 8/2004 | Putter et al. | |
| 6,797,428 B1 | 9/2004 | Skotheim et al. | |
| 6,835,493 B2 | 12/2004 | Zhang et al. | |
| 6,849,702 B2 | 2/2005 | Callahan et al. | |
| 6,852,139 B2 | 2/2005 | Zhang et al. | |
| 6,886,240 B2 | 5/2005 | Zhang et al. | |
| 7,204,862 B2 | 4/2007 | Zhang | |
| 7,247,408 B2 | 7/2007 | Skotheim et al. | |
| 7,553,590 B2 | 6/2009 | Mikhaylik | |
| 7,771,870 B2 | 8/2010 | Affinito et al. | |
| 7,785,730 B2 | 8/2010 | Affinito et al. | |
| 8,076,024 B2 | 12/2011 | Affinito et al. | |
| 8,105,717 B2 | 1/2012 | Skotheim et al. | |
| 8,197,971 B2 | 6/2012 | Skotheim et al. | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 9,040,201 B2 | 5/2015 | Affinito et al. | |
| 9,065,149 B2 | 6/2015 | Skotheim et al. | |
| 9,397,342 B2 | 7/2016 | Skotheim et al. | |
| 9,825,328 B2 | 11/2017 | Du et al. | |
| 9,947,963 B2 | 4/2018 | Du et al. | |
| 9,994,959 B2 | 6/2018 | Laramie et al. | |
| 9,994,960 B2 | 6/2018 | Laramie et al. | |
| 10,388,987 B2 | 8/2019 | Du et al. | |
| 10,461,372 B2 | 10/2019 | Laramie et al. | |
| 2001/0041294 A1 | 11/2001 | Chu et al. | |
| 2002/0034688 A1 | 3/2002 | Chu et al. | |
| 2002/0071905 A1 | 6/2002 | Akedo | |
| 2002/0071989 A1 | 6/2002 | Verma et al. | |
| 2002/0086216 A1 * | 7/2002 | Sekino .................. | H01M 6/164 429/330 |
| 2003/0224234 A1 | 12/2003 | Steele et al. | |
| 2004/0142244 A1 | 7/2004 | Visco et al. | |
| 2004/0175621 A1 | 9/2004 | Iriyama et al. | |
| 2004/0197641 A1 | 10/2004 | Visco et al. | |
| 2005/0051763 A1 | 3/2005 | Affinito et al. | |
| 2005/0089757 A1 | 4/2005 | Bannai et al. | |
| 2005/0095504 A1 | 5/2005 | Kim et al. | |
| 2005/0100793 A1 | 5/2005 | Jonghe et al. | |
| 2005/0186469 A1 | 8/2005 | De Jonghe et al. | |
| 2005/0208353 A1 | 9/2005 | Johnson | |
| 2005/0255385 A1 | 11/2005 | Harrup et al. | |
| 2006/0159997 A1 | 7/2006 | Sunagawa et al. | |
| 2006/0222954 A1 | 10/2006 | Skotheim et al. | |
| 2007/0117007 A1 | 5/2007 | Visco et al. | |
| 2007/0172739 A1 | 7/2007 | Visco et al. | |
| 2007/0212583 A1 | 9/2007 | Johnson | |
| 2007/0221265 A1 | 9/2007 | Affinito et al. | |
| 2008/0014501 A1 | 1/2008 | Skotheim et al. | |
| 2008/0057397 A1 | 3/2008 | Skotheim et al. | |
| 2008/0070087 A1 | 3/2008 | Johnson | |
| 2008/0213672 A1 | 9/2008 | Skotheim et al. | |
| 2009/0191431 A1 | 7/2009 | Washima et al. | |
| 2010/0104948 A1 | 4/2010 | Skotheim et al. | |
| 2010/0330410 A1 | 12/2010 | Takahashi et al. | |
| 2011/0014524 A1 | 1/2011 | Skotheim et al. | |
| 2011/0159376 A1 | 6/2011 | Skotheim et al. | |
| 2011/0165471 A9 | 7/2011 | Skotheim et al. | |
| 2011/0200863 A1 | 8/2011 | Xiao et al. | |
| 2011/0200868 A1 | 8/2011 | Klaassen | |
| 2012/0231321 A1 * | 9/2012 | Huang .................. | H01M 2/145 429/144 |

(56) References Cited

U.S. PATENT DOCUMENTS

| | | |
|---|---|---|
| 2012/0276449 A1 | 11/2012 | Skotheim et al. |
| 2013/0026409 A1 | 1/2013 | Baker et al. |
| 2013/0095380 A1 | 4/2013 | Affinito et al. |
| 2013/0143096 A1 | 6/2013 | Affinito et al. |
| 2013/0327704 A1 | 12/2013 | Wu et al. |
| 2014/0170465 A1 | 6/2014 | Visco et al. |
| 2014/0170504 A1 | 6/2014 | Baek et al. |
| 2014/0272594 A1* | 9/2014 | Safont Sempere . H01M 4/1395 429/231.95 |
| 2014/0315078 A1* | 10/2014 | Chang ................... H01M 4/131 429/188 |
| 2015/0086837 A1 | 3/2015 | Laramie et al. |
| 2015/0171398 A1* | 6/2015 | Roumi ............... G01R 31/3828 429/7 |
| 2015/0287986 A1 | 10/2015 | Affinito et al. |
| 2015/0311497 A1* | 10/2015 | Nettesheim ............. B05B 7/226 429/209 |
| 2015/0333314 A1 | 11/2015 | Pirk et al. |
| 2016/0344067 A1 | 11/2016 | Laramie et al. |
| 2017/0018815 A1 | 1/2017 | Laramie et al. |
| 2017/0149086 A1 | 5/2017 | Du et al. |
| 2018/0198162 A1 | 7/2018 | Du et al. |
| 2018/0230610 A1 | 8/2018 | Laramie et al. |
| 2018/0337406 A1 | 11/2018 | Mudalige et al. |
| 2018/0351148 A1 | 12/2018 | Schneider et al. |
| 2018/0351158 A1 | 12/2018 | Liao et al. |

FOREIGN PATENT DOCUMENTS

| | | |
|---|---|---|
| JP | S63-126156 A | 5/1988 |
| JP | H04-028172 B2 | 5/1992 |
| JP | H09-279357 A | 10/1997 |
| JP | 2001-015162 A | 1/2001 |
| JP | 2003-077461 A | 3/2003 |
| JP | 2003-217574 A | 7/2003 |
| JP | 2004-087251 A | 3/2004 |
| JP | 2005-174924 A | 6/2005 |
| JP | 2008-021424 A | 1/2008 |
| JP | 2008-234843 A | 10/2008 |
| JP | 2010-073339 A | 4/2010 |
| JP | 2013-149373 A | 8/2013 |
| JP | 2014-093260 A | 5/2014 |
| KR | 2002-0085422 A | 11/2002 |
| WO | WO-97/01870 A1 | 1/1997 |
| WO | WO-97/44840 A1 | 11/1997 |
| WO | WO-99/19931 A1 | 4/1999 |
| WO | WO-99/33125 A1 | 7/1999 |
| WO | WO-99/57770 A1 | 11/1999 |
| WO | WO-01/33651 A1 | 5/2001 |
| WO | WO-01/39302 A1 | 5/2001 |
| WO | WO-01/39303 A1 | 5/2001 |
| WO | WO-01/97304 A1 | 12/2001 |
| WO | WO-03/100888 A1 | 12/2003 |
| WO | WO-2004/036669 A2 | 4/2004 |
| WO | WO-2005/038953 A2 | 4/2005 |

OTHER PUBLICATIONS

Extended European Search Report for Ep App. No. 17171920.6 dated Sep. 8, 2017.

International Search Report and Written Opinion for PCT/US2017/033488 dated Sep. 12, 2017.

Bhattacharyya et al., Second Phase Effects on the Conductivity of Non-Aqueous Salt Solutions: "Soggy Sand Electrolytes". Advanced Materials. 2004;16:811-814.

Pfaffenhuber, Short and Long Range Transport Effects in Salt Containing Solid-Liquid Composites. Thesis. Max Planck Institute. Mar. 2014. 141 pages.

Pfannkuch, On the Correlation of Electrical Conductivity Properties of Porous Systems with Viscous Flow Transport Coefficients. Developments in Soil Science: Fundamentals of Transport Phenomena in Porous Media. 1972;2:42-54.

Revil et al., Theory of ionic-surface electrical conduction in porous media. Physical Review B. Jan. 1997;55(3):1757-73.

[No Author Listed], A Basic Guide to Particle Characterization. Inform White Paper. Malvern Instruments Limited. Worcestershire, UK. May 2, 2012:26 pages.

\* cited by examiner

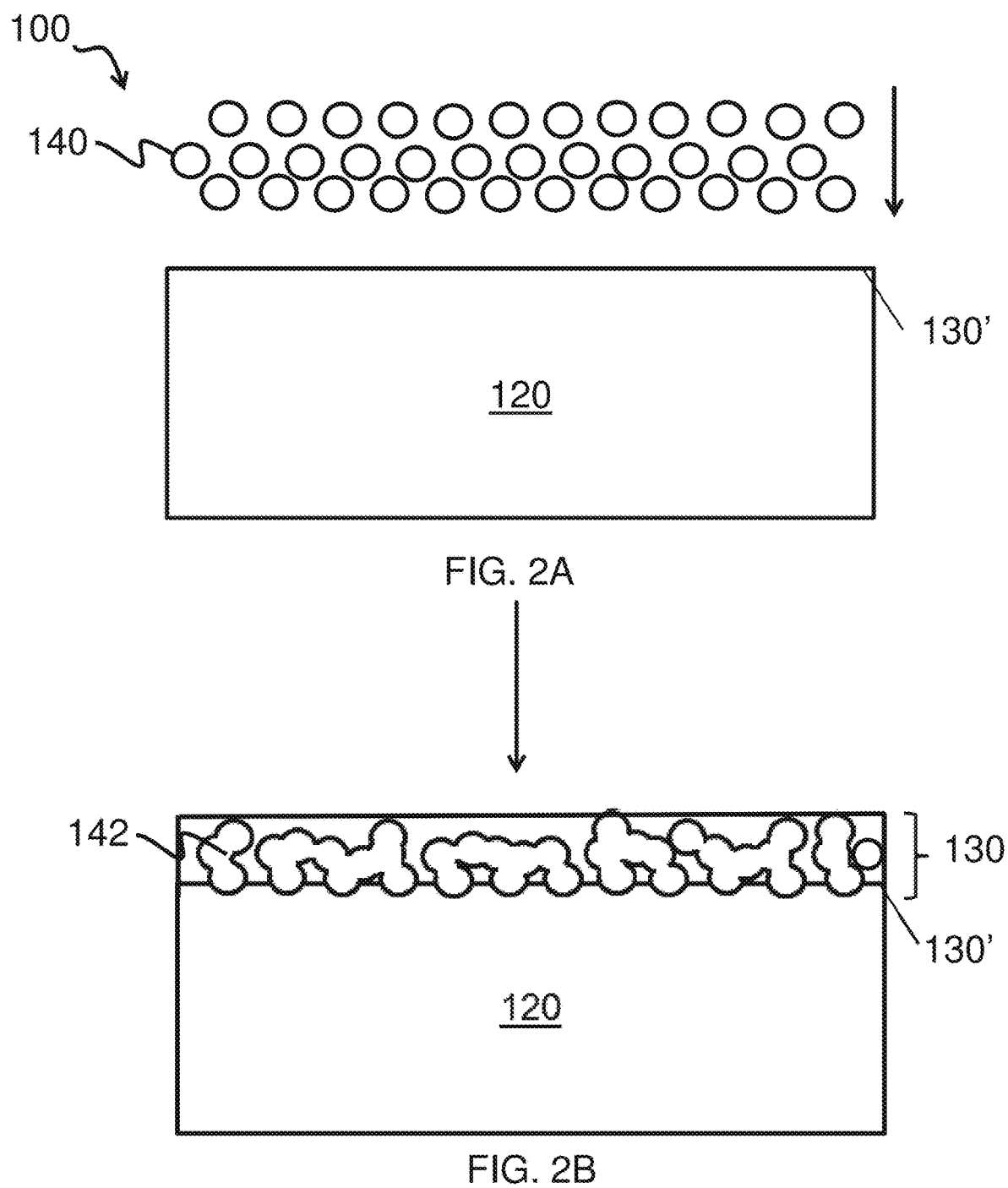

PROTECTIVE LAYERS FOR ELECTRODES AND ELECTROCHEMICAL CELLS

RELATED APPLICATIONS

This application claims priority to U.S. Provisional Application No. 62/339,340, filed May 20, 2016, which is incorporated herein by reference in its entirety.

FIELD

Articles and methods including protective layers, e.g., for protection of electrodes in electrochemical cells, are provided.

BACKGROUND

One of the factors that decreases cycle life in lithium-(or other alkali metal- or alkali earth metal-) based batteries is the consumption of electrolyte during cycling of the battery due to reaction of metallic lithium present in the electrodes with the electrolyte. In order to minimize, or substantially prevent, this reaction and consequently increase the cycle life of the cell, it is desirable to isolate the metallic lithium from the electrolyte. This often times involves the use of a lithium ion conductive material layer coated on the surface of the metallic lithium. This material allows lithium ions to diffuse to and from the metallic lithium surface while excluding the electrolyte from contacting the lithium surface, therefore preventing any side reactions between lithium and the electrolyte. Although certain protective structures have been fabricated, improvements in the protective structures for lithium and other alkali metal electrodes would be beneficial and would have application in a number of different fields involving the use of such batteries and electrodes.

SUMMARY

Articles and methods including a first layer and a second layer deposited on the first layer (e.g., protective layers, such as those for protection of electrodes in electrochemical cells), are provided. In certain aspects, electrode structures and/or methods for making electrode structures including an anode comprising lithium metal or a lithium metal alloy and a second layer in the form of a protective layer including a plurality of particles (e.g., fused inorganic particles) described herein are provided. The subject matter disclosed herein involves, in some cases, interrelated products, alternative solutions to a particular problem, and/or a plurality of different uses of one or more systems and/or articles.

In one aspect, articles for use in an electrochemical cell are provided. In some embodiments, the article comprises a first layer and a second layer deposited on the first layer, wherein the second layer comprises a plurality of particles, and wherein the second layer is porous, wherein at least a portion of the plurality of particles are at least partially embedded within the first layer, wherein at least a portion of the plurality of particles are fused to one another, and wherein the second layer has an average thickness between about 0.1 microns and about 5 microns.

In some embodiments, an article for use in an electrochemical cell comprises a first layer comprising a coating, wherein the coating comprises a first material, and a second layer deposited on the coating of the first layer, wherein the second layer comprises a plurality of particles formed of a second material. The first material has a hardness greater than a hardness of the second material. At least a portion of the plurality of particles are fused to one another. The second layer has an average thickness between about 0.1 microns and about 5 microns.

In some embodiments, the article comprises a first layer and a second layer comprising a non-ionically conductive material disposed on the first layer, wherein the non-ionically conductive material is present in the second layer in an amount of at least 80 wt % of the second layer, wherein at least a portion of the second layer is at least partially embedded within the first layer, and wherein the second layer has an average thickness between about 0.1 microns and about 5 microns.

In some embodiments, the article comprises a first layer and a second layer disposed on the first layer, wherein the second layer comprises particles, and wherein the second layer is porous and comprises a non-ionically conductive material, wherein the non-ionically conductive material is present in the second layer in an amount of at least 80 wt % of the second layer, and wherein the second layer has an average thickness between about 0.1 microns and about 5 microns.

In another aspect, electrochemical cells are provided. In some embodiments, the electrochemical cell comprises a first layer a second layer disposed on the first layer, wherein the second layer is porous and comprises a plurality of particles, wherein at least a portion of the plurality of particles comprise a non-ionically conductive material, wherein the second layer has an ionic conductivity less than about $10^{-6}$ S/cm, wherein the second layer has an average thickness between about 0.1 microns and about 5 microns, and a liquid electrolyte, wherein the second layer is permeable to the liquid electrolyte.

In yet another aspect, methods of forming an article for use in an electrochemical cell are provided. In one instance, the method comprises exposing a first layer comprising a first layer material to a plurality of particles having a velocity of at least 200 m/s, wherein the particles comprise a second material different from the first layer material; embedding at least a portion of the particles in the first layer; and forming a second layer comprising the second material, wherein the second layer is porous and has an ionic conductivity of less than $10^{-6}$ S/cm.

In some embodiments, the method comprises exposing a first layer comprising a first material to a plurality of particles having a velocity sufficient to cause fusion of at least some of the particles, wherein the particles comprise a second material, embedding at least a portion of the particles in the first layer, forming a second layer comprising the second material, wherein the second layer is porous and has an ionic conductivity of less than $10^{-6}$ S/cm.

Other advantages and novel features of the present invention will become apparent from the following detailed description of various non-limiting aspects of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting aspects of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each aspect of the invention shown where illustration is not necessary to allow those of ordinary skill in the art to understand the invention. In the figures:

FIGS. 2A-B are a schematic representation of a method for manufacturing an electrode structure, according to certain aspects;

DETAILED DESCRIPTION

Figure 1A:
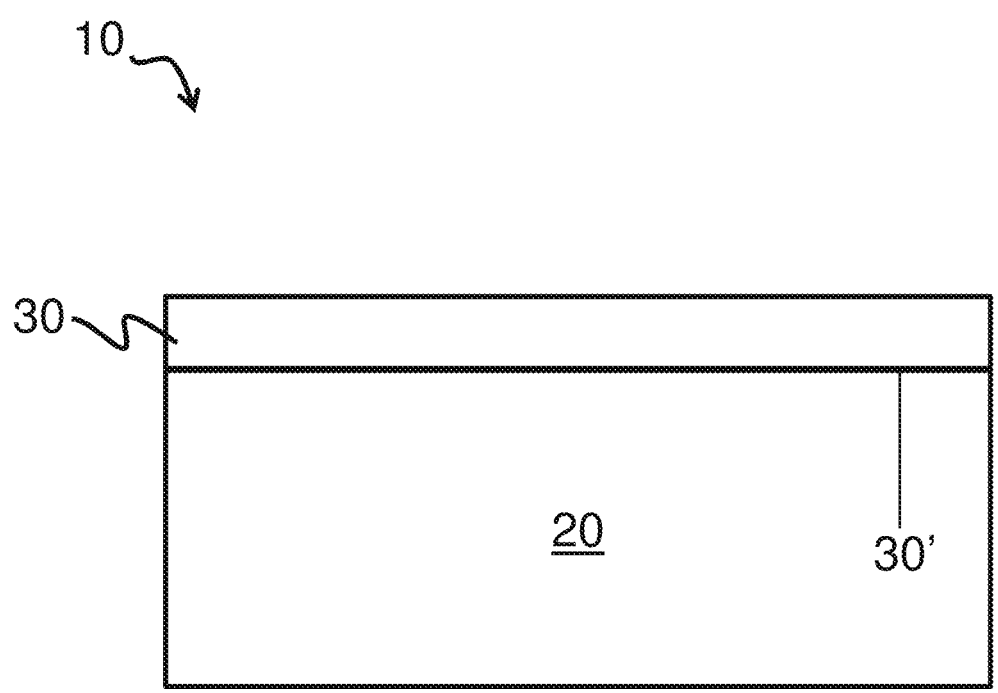
FIG. 1A is a schematic representation of a protective layer/resulting deposited layer (e.g., a second layer) deposited on an underlying layer (e.g., a first layer), according to certain aspects.

Articles and methods including layers for protection of electrodes and/or other components in electrochemical cells are provided. As described herein, a layer, such as a protective layer (second layer) for an electrode (first layer), may comprise a plurality of particles (e.g., crystalline inorganic particles, amorphous inorganic particles). In some aspects, at least a portion of the plurality of particles (e.g., inorganic particles) are fused to one another. For instance, in some aspects, the second layer may be formed by aerosol deposition or another suitable process that involves subjecting the particles to a relatively high velocity such that fusion of particles occurs during deposition on the first layer. In some aspects, the deposited layer (e.g., the layer comprising a plurality of particles), i.e. the second layer, is an ion-conducting layer or non-ionically conductive layer. In some cases, the deposited layer (e.g., an ion-conducting layer or non-ionically conductive layer), i.e. the second layer, comprises a polymeric material (e.g., greater than about 20 vol % polymer versus total volume fraction of the layer). At least a portion of the plurality of particles may be embedded within another layer (the first layer, e.g., a substrate, such as an electrode). In certain aspects, the plurality of particles are formed of a first material (e.g., a non-ionically conductive material), and the layer may optionally comprise a second material (e.g., an ionically conductive material) different from the first material. In other embodiments, a single material is used (e.g., a non-ionically conductive material or an ionically-conductive material). For example, the plurality of particles may be formed of a single material.

In some embodiments, materials referred to as non-ionically conductive materials may also substantially impede flow of electrons across said material, e.g., they have an electronic conductivity of less than about $10^{-10}$ S/cm or another suitable range described herein.

In some cases, the protective layer and/or the resulting deposited layer may be a porous layer. In some embodiments, the protective layer (e.g., the porous protective layer) comprises an ionically conductive material (e.g., an ion conductive ceramic). In certain embodiments, the protective layer (e.g., the porous protective layer) comprises an ionically conductive material and a second material such as a non-ionically conductive material (e.g., a non-ionically conductive ceramic) and/or a polymer (e.g., a polymer particle such as a polymer sphere). In some cases, the protective layer (e.g., the porous protective layer) may comprise a non-ionically conductive material.

Advantageously, a protective layer and/or resulting deposited layer described herein may maintain the bulk properties of the materials used to form the layer (e.g., crystallinity, ion-conductivity), may permit the incorporation of materials (e.g., ceramics, non-ionically conductive materials) that would not be generally feasible under traditional vacuum deposition methods, provide the formation of a protective layer/deposited layer directly on an electrode surface and/or a separator surface, and/or eliminate the need for a separate release step from a substrate such that the protective layer may be incorporated into an electrochemical cell.

When the protective layer and/or resulting deposited layer comprises substantially no ionically conductive material (or even in embodiments in which the protective layer includes ionically conductive material), the layer may be sufficiently porous such that the protective layer permits the transfer of ions across the protective layer. In certain conventional electrochemical cells comprising protective layers, porosity in the protective layer has generally been undesirable because it allows the electrolyte to reach the electrode to cause undesirable reactions; however, the inventors of the present application have discovered within the context of the disclosure that such porous layers may permit the transfer of ions across the layer while electrochemical cells including such layers exhibit significantly increased cycle life and/or decreased initial resistance as compared to electrochemical cells including certain existing protective layers.

Without wishing to be bound by theory, it is believed that the porous protective layer (e.g., comprising a non-ionically conductive material, polymeric particles, and/or an ionically conductive material) may result in higher charge concentration at the solid-liquid interface between an electrolyte and the surface of the pores within the protective layer compared to the bulk electrolyte charge concentration. For example, the ion current may divide into a surface component and a bulk electrolyte component, such that higher current levels can be handled by the electrochemical cell even though the perceived current paths would be restricted by the porous network. Advantageously, such porous protective layers may therefore have lower initial impedance (e.g., without wishing to be bound by theory, as a result of surface conduction elements within the pores to present a lower overall resistance) and/or an increase in ion transference number (i.e., the fraction of total current carried in an electrolyte by a given ion), as compared to unprotected electrodes and/or electrodes having certain traditional protective layers (e.g., non-porous protective layers). In some such embodiments, the protective layer may serve to protect the electrode by limiting exposure of the electrode to direct contact with the electrolyte (e.g., and thereby increasing cell cycle life), while permitting some exposure of the electrode to the electrolyte to allow for ion conduction across the layer.

Moreover, the porous protective layers described herein may simultaneously allow protection of the electroactive layer (e.g., by reducing the amount of exposure of the electroactive layer to adverse species), while allowing good ionic conductivity across the protective layer and allowing exposure of the electroactive layer to beneficial species in the electrolyte, thereby enhancing the overall performance of the electrochemical cell compared to electrochemical cells that do not include such a porous protective layer.

The disclosed protective layers (e.g., ion-conductive layers, non-ionically conductive layers) may be incorporated into an electrochemical cell such as a lithium-based electrochemical cell (e.g., a lithium-sulfur electrochemical cell, a lithium-ion electrochemical cell). Although several of the aspects described herein involve use of such a layer as a protective layer for an electrode, it should be appreciated that the layer may be used as any other appropriate component within an electrochemical cell.

In some aspects in which the electrochemical cell is a lithium-sulfur electrochemical cell, the incorporation of protective layers described herein into electrochemical cells may significantly increase cycle life of the electrochemical cell as compared to certain existing protective layers, and/or prevent or reduce the occurrence of chemical reactions between species in the electrolyte (e.g., polysulfides, such as those found in electrolytes) and an electroactive material of an anode (e.g., an anode comprising lithium, such as metallic lithium). The use of protective layers as described herein may offer several advantages over certain traditional protective layers, including increasing utilization of sulfur within an electrochemical cell, reduction or elimination of the shuttle affect, and/or reduction or elimination of electrolyte depletion. Protective layers and/or composite structures comprising a plurality of particles, as described in more detail herein, may, in some cases, selectively conduct lithium cations. In some aspects, the protective layers comprising a plurality of particles are not conductive towards certain ions, such as polysulfide anions. In some embodiments, the protective layer may be porous and/or permeable to an electrolyte (e.g., such that a liquid electrolyte may contact the electroactive material of an anode and/or a cathode).

Moreover, the protective layers as described herein may offer additional advantages over certain traditional protective layers including increased chemical stability and/or overall ion conductivity, e.g., between a lithium anode and an electrolyte. For example, a porous protective layer comprising a plurality of fused particles may maintain the bulk properties of the materials used to form the layer and may permit the incorporation of materials (e.g., ceramics) that would not be generally feasible under traditional vacuum deposition methods (e.g., without decreasing cycle life), and/or decrease manufacturing cost.

In addition, in some cases, because the particles within the layer may have relatively high ion conductivity, the ion conductivity of the layers described herein may be comparable to those of certain existing protective layers.

In some embodiments, the deposited layer (second layer) described herein may be a separator. Advantageously, the deposited layers described herein (e.g., a porous layer having a thickness of at least 3 microns, or at least 5 microns) may eliminate the need for an independent separator layer in an electrochemical cell. In some embodiments, the deposited layer functions as both a protective layer and as a separator layer.

The disclosed protective layers and/or the resulting deposited layer may be incorporated into electrochemical cells, for example, primary batteries or secondary batteries, which can be charged and discharged numerous times. In some aspects, the materials, systems, and methods described herein can be used in association with lithium batteries (e.g., lithium-sulfur batteries, lithium-ion batteries). The electrochemical cells described herein may be employed in various applications, for example, making or operating cars, computers, personal digital assistants, mobile telephones, watches, camcorders, digital cameras, thermometers, calculators, laptop BIOS, communication equipment or remote car locks. It should be appreciated that while much of the description herein relates to lithium-sulfur and/or lithium-ion batteries, the protective layers described herein may be applied to other lithium-based batteries, as well as other alkali metal-based batteries.

Turning now to the figures, the various aspects of the current disclosure are described in more detail below. It should be understood that while certain layers depicted in the figures are disposed directly on one another, other intermediate layers may also be present between the depicted layers in certain aspects. Accordingly, as used herein, when a layer is referred to as being "disposed on", "deposited on", or "on" another layer, it can either be directly disposed on, deposited onto, or on the layer, or an intervening layer may also be present. In contrast, a layer that is "directly disposed on", "in contact with", "directly deposited on", or "directly on" another layer indicates that no intervening layer is present.

FIG. 1A depicts one aspect of an electrode structure 10. The electrode structure includes a first layer 20 (e.g., an electroactive layer) and a second layer 30 (e.g., a protective layer such as an ion-conductive layer, or a non-ionically conductive layer) disposed on the first layer at first surface 30'. As described herein, second layer 30 may be used as a protective layer, e.g., to protect the underlying layer (e.g., from reaction with an electrolyte, or species within the electrolyte). In some instances, at least a portion of the second layer is at least partially embedded within the first layer. In certain embodiments, second layer 30 may be porous and may permit contact of the underlying layer with an electrolyte and/or a species within the electrolyte; however, the layer may promote an overall increase in cycle life as describe in more detail below. Second layer 30 may comprise, in some cases, a plurality of particles. The plurality of particles may be of a single type, or of more than one type, as described in more detail below. In some aspects, the first layer comprises a first layer material (e.g., an electroactive material, a material used to form a separator, substrate, or other component) and the second layer comprises one or more materials different from the first layer material (e.g., a plurality of particles comprising an inorganic material different than the material used to form the first layer). In certain embodiments, the second layer comprises two or more materials (e.g., an ionically conductive material and a non-ionically conductive material).

Figure 1B:
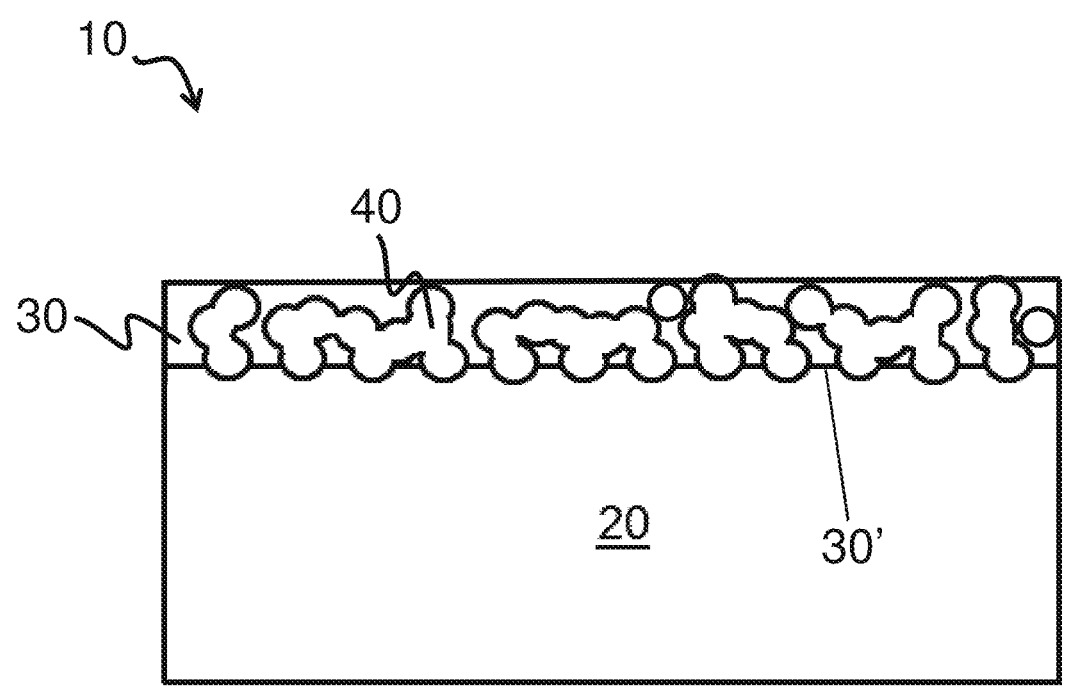
FIG. 1B is another schematic representation of a protective layer/resulting deposited layer (e.g., a second layer) deposited on an underlying layer (e.g., a first layer), according to certain aspects.

In some embodiments, at least a portion of the second layer is at least partially embedded within the first layer. For example, as illustrated in FIG. 1B, electrode structure 10 comprises first layer 20 (e.g., an electroactive layer or other layer described herein) and second layer 30 (e.g., a protective layer). At least portions of the second layer may be embedded in the surface of the first layer. In some cases, embedding of the second layer into the first layer may occur by a deposition process described herein.

In some aspects, the plurality of particles (e.g., inorganic particles) are fused. For example, as illustrated in FIG. 1B, a plurality of particles 40 are shown. In some such aspects, at least a portion of the plurality of particles 40 are fused as shown illustratively in the figure. In some embodiments, the plurality of particles (e.g., fused inorganic particles) are at least partially embedded in the first layer. As an example, as described in more detail below, the second layer may be formed at least in part by subjecting the first layer to particles traveling at a certain velocity such that the particles impinge upon the first layer upon contact, and/or fuse with one another upon collision. As shown in this illustrative aspect, second layer 30 has first surface 30', which may be adjacent the first layer 20. The plurality of particles (e.g., the plurality of fused particles) may, in some cases, contact and/or be embedded in at least a portion of the first layer 20 at first surface 30'.

In some aspects, the average largest cross-sectional dimension of the particles (e.g., prior to being fused or absent any fusion) may be, for example, less than or equal to 20 microns, less than or equal to about 10 microns, less than or equal to about 5 microns, less or equal to about 2 microns, less than or equal to about 1 micron, or less than or equal to about 0.75 microns. In some aspects, the average largest cross-sectional dimension of the plurality of particles (e.g., prior to being fused or absent any fusion) may be greater than or equal to about 0.5 microns, greater than or equal to about 0.75 microns, greater than or equal to about 1 micron, greater than or equal to about 1.5 microns, greater than or equal to about 2 microns, greater than or equal to about 3 microns, greater than or equal to about 5 microns, greater than or equal to about 10 microns, or greater than or equal to about 15 microns. Combinations of the above-referenced ranges are also possible (e.g., a largest cross-sectional dimension of less than about 20 microns and greater than about 0.5 microns, a largest cross-sectional dimension of less than about 15 microns and greater than about 1 micron). In some aspects in which more than one particle type is included in a layer, each particle type may have a value of average largest cross-sectional dimension in one or more of the above-referenced ranges.

As described above, in some aspects at least a portion of the plurality of particles in a layer may be fused. The terms "fuse" and "fused" (and "fusion") are given their typical meaning in the art and generally refers to the physical joining of two or more objects (e.g., particles) such that they form a single object. For example, in some cases, the volume occupied by a single particle (e.g., the entire volume within the outer surface of the particle) prior to fusion is substantially equal to half the volume occupied by two fused particles. Those skilled in the art would understand that the terms "fuse", "fused", and "fusion" do not refer to particles that simply contact one another at one or more surfaces, but particles wherein at least a portion of the original surface of each individual particle can no longer be discerned from the other particle. In some embodiments, a fused particle (e.g., a fused particle having the equivalent volume of the particle prior to fusion) may have a minimum cross-sectional dimension of less than 1 micron. For example, the plurality of particles after being fused may have an average minimum cross-sectional dimension of less than 1 micron, less than 0.75 microns, less than 0.5 microns, less than 0.2 microns, or less than 0.1 microns. In certain embodiments, the plurality of particles after being fused have an average minimum cross-sectional dimension of greater than or equal to 0.05 microns, greater than or equal to 0.1 microns, greater than or equal to 0.2 microns, greater than or equal to 0.5 microns, or greater than or equal to 0.75 microns. Combinations of the above-referenced ranges are also possible (e.g., less than 1 micron and greater than or equal to 0.05 microns). Other ranges are also possible.

In some cases, the particles are fused such that at least a portion of the plurality of particles form a continuous pathway across the second layer (e.g., between a first surface of the second layer and a second surface of the second layer). A continuous pathway may include, for example, an ionically-conductive pathway from a first surface to a second, opposing surface of the layer in which there are substantially no gaps, breakages, or discontinuities in the pathway. Whereas fused particles across a layer may form a continuous pathway, a pathway including packed, unfused particles would have gaps or discontinuities between the particles that would not render the pathway continuous. In certain aspects, the layer includes a plurality of such continuous pathways across the layer. In some aspects, at least 10 vol %, at least 30 vol %, at least 50 vol %, or at least 70 vol % of the second layer comprises one or more continuous pathways comprising fused particles (e.g., which may comprise an ionically conductive material). In certain aspects, less than or equal to about 100 vol %, less than or equal to about 90 vol %, less than or equal to about 70 vol %, less than or equal to about 50 vol %, less than or equal to about 30 vol %, less than or equal to about 10 vol %, or less than or equal to about 5 vol % of the second layer comprises one or more continuous pathways comprising fused particles. Combinations of the above-referenced ranges are also possible (e.g., at least about 10 vol % and less than or equal to about 100 vol %). In some cases, 100 vol % of the second layer comprises one or more continuous pathways comprising fused particles. That is to say, in some aspects, the second layer consists essentially of fused particles (e.g., the second layer comprises substantially no unfused particles). In other aspects, substantially all of the particles are unfused.

Those skilled in the art would be capable of selecting suitable methods for determining if the particles are fused including, for example, performing Confocal Raman Microscopy (CRM). CRM may be used to determine the percentage of fused areas within a layer described herein. For instance, in some aspects the fused areas may be less crystalline (more amorphous) compared to the unfused areas (e.g., particles) within the layer, and may provide different Raman characteristic spectral bands than those of the unfused areas. In certain aspects the fused areas may be amorphous and the unfused areas (e.g., particles) within the layer may be crystalline. Crystalline and amorphous areas may have peaks at the same/similar wavelengths, while amorphous peaks may be broader/less intense than those of crystalline areas. In some instances, the unfused areas may include spectral bands substantially similar to the spectral bands of the bulk particles prior to formation of the layer (the bulk spectrum). For example, an unfused area may include peaks at the same or similar wavelengths and having a similar area under the peak (integrated signal) as the peaks within the spectral bands of the particles prior to formation of the layer. An unfused area may have, for instance, an integrated signal (area under the peak) for the largest peak (the peak having the largest integrated signal) in the spectrum that may be, e.g., within at least 70%, at least 75%, at least 80%, at least 85%, at least 90%, at least 95%, or at least 97% of value of the integrated signal for the corresponding largest peak of the bulk spectrum. By contrast, the fused areas may include spectral bands different from (e.g., peaks at the same or similar wavelengths but having a substantially different/lower integrated signal than) the spectral bands of the particles prior to formation of the layer. A fused area may have, for instance, an integrated signal (area under the peak) for the largest peak (the peak having the largest integrated signal) in the spectrum that may be, e.g., less than 50%, less than 60%, less than 70%, less than 75%, less than 80%, less than 85%, less than 90%, less than 95%, or less than 97% of value of the integrated signal for the corresponding largest peak of the bulk spectrum. In some aspects, 2-dimensional or 3-dimensional mapping of CRM may be used to determine the percentage of fused areas in the layer (e.g., the percentage of area, within a minimum cross-sectional area, having an integrated signal for the largest peak of the spectrum that differs from that for the particles prior to formation of the layer, as described above). The minimum cross-sectional area of the layer used for such an analysis may be, for example, at least 600 $\mu m^2$, at least 900 $\mu m^2$, at least 1000 $\mu m^2$, at least 2000 $\mu m^2$, at least 3000 $\mu m^2$, at least 5000 $\mu m^2$, at least 7000 $\mu m^2$, or at least 10,000 $\mu m^2$, and the intervals of measurement (spatial resolution) within the area may be, for example, 1 $\mu m^2$ or less, 2 $\mu m^2$ or less, 4 $\mu m^2$ or less, 6 $\mu m^2$ or less, or 9 $\mu m^2$ or less. (If a 3-dimensional image is obtained, the minimum volume of the layer used for such an analysis may be, for example, at least 600 $\mu m^3$, at least 900 $\mu m^3$, at least 1000 $\mu m^3$, at least 2000 $\mu m^3$, at least 3000 $\mu m^3$, at least 5000 $\mu m^3$, at least 7000 $\mu m^3$, or at least 10,000 $\mu m^3$, and the intervals of measurement (spatial resolution) within the volume may be, for example, 1 $\mu m^3$ or less, 4 $\mu m^3$ or less, 8 $\mu m^3$ or less, 16 $\mu m^3$ or less, 27 $\mu m^3$ or less, or 64 $\mu m^3$ or less) An average of at least 3, 5, or 7 images may be used to determine percentage of fused area for a particular sample.

In other aspects, the presence of fused particles in a layer comprising ionically conductive material may be determined by determining the conductivity of a layer. For instance, a layer comprising fused particles may have an average conductivity greater than an average conductivity of a layer in which the particles are not fused, all other factors being equal. An average of at least 3, 5, or 7 measurements may be used to determine the conductivity for a particular sample.

The plurality of particles may be deposited and/or fused using any suitable method. In some aspects, a method may involve forming a protective layer/deposited layer (e.g., a second layer) adjacent to or disposed on a portion of a first layer (e.g., an electroactive material such as an anode comprising lithium, a cathode (e.g., comprising sulfur or other suitable substrate as described herein). In certain aspects, the plurality of particles are deposited and/or fused via an aerosol deposition process. Aerosol deposition processes are known in the art and generally comprise depositing (e.g., spraying) particles (e.g., inorganic particles, polymeric particles) at a relatively high velocity on a surface. For example, in some aspects, the plurality of particles are deposited on the first layer (e.g., the electroactive material layer) at a relative high velocity such that at least a portion of the plurality of particles fuse (e.g., forming the second layer on the first layer). The velocity required for particle fusion may depend on factors such as the material composition of the particles, the size of the particles, the Young's elastic modulus of the particles, and/or the yield strength of the particles or material forming the particles.

In some embodiments, the articles (e.g., particles, layers) described herein may be formed by and/or combined with by the methods and/or articles described in U.S. application Ser. No. 15/160,191 filed May 20, 2016, which is incorporated herein by reference in its entirety for all purposes.

As described herein, in some aspects, the particles are deposited at a velocity sufficient to cause fusion of at least some of the particles. It should be appreciated, however, that in some aspects, the particles are deposited at a velocity such that at least some of the particles are not fused. In certain aspects, the velocity of the particles is at least about 150 m/s, at least about 200 m/s, at least about 300 m/s, at least about 400 m/s, or at least about 500 m/s, at least about 600 m/s, at least about 800 m/s, at least about 1000 m/s, or at least about 1500 m/s. In some aspects, the velocity is less than or equal to about 2000 m/s, less than or equal to about 1500 m/s, less than or equal to about 1000 m/s, less than or equal to about 800 m/s, 600 m/s, less than or equal to about 500 m/s, less than or equal to about 400 m/s, less than or equal to about 300 m/s, or less than or equal to about 200 m/s. Combinations of the above-referenced ranges are also possible (e.g., between about 150 m/s and about 2000 m/s, between about 150 m/s and about 600 m/s, between about 200 m/s and about 500 m/s, between about 200 m/s and about 400 m/s, between about 500 m/s and about 2000 m/s). Other velocities are also possible. In some aspects in which more than one particle type is included in a layer, each particle type may be deposited at a velocity in one or more of the above-referenced ranges.

In some aspects, the deposition method comprises spraying the particles (e.g., via aerosol deposition) on the surface of a first layer by pressurizing a carrier gas with the particles. In some aspects, the pressure of the carrier gas is at least about 5 psi, at least about 10 psi, at least about 20 psi, at least about 50 psi, at least about 90 psi, at least about 100 psi, at least about 150 psi, at least about 200 psi, at least about 250 psi, or at least about 300 psi. In certain aspects, the pressure of the carrier gas is less than or equal to about 350 psi, less than or equal to about 300 psi, less than or equal to about 250 psi, less than or equal to about 200 psi, less than or equal to about 150 psi, less than or equal to about 100 psi, less than or equal to about 90 psi, less than or equal to about 50 psi, less than or equal to about 20 psi, or less than or equal to about 10 psi. Combinations of the above-referenced ranges are also possible (e.g., between about 5 psi and about 350 psi). Other ranges are also possible and those skilled in the art would be capable of selecting the pressure of the carrier gas based upon the teachings of this specification. For example, in some aspects, the pressure of the carrier gas is such that the velocity of the particles deposited on the first layer is sufficient to fuse at least some of the particles to one another.

In some aspects, the carrier gas (e.g., the carrier gas with the particles) is heated prior to deposition. In some aspects, the temperature of the carrier gas is at least about 20° C., at least about 25° C., at least about 30° C., at least about 50° C., at least about 75° C., at least about 100° C., at least about 150° C., at least about 200° C., at least about 300° C., or at least about 400° C. In certain aspects, the temperature of the carrier gas is less than or equal to about 500° C., is less than or equal to about 400° C., is less than or equal to about 300° C., is less than or equal to about 200° C., is less than or equal to about 150° C., is less than or equal to about 100° C., is less than or equal to about 75° C., is less than or equal to about 50° C., is less than or equal to about 30° C. or less than or equal to about 20° C. Combinations of the above-referenced ranges are also possible (e.g., between about 20° C. and about 500° C.). Other ranges are also possible.

In certain aspects, the particles are deposited under a vacuum environment. For example, in some aspects, the particles may be deposited on the first layer in a container in which vacuum is applied to the container (e.g., to remove atmospheric resistance to particle flow, to permit high velocity of the particles, and/or to remove contaminants). In certain aspects, the vacuum pressure within the container is at least about 0.5 mTorr, at least about 1 mTorr, at least about 2 mTorr, at least about 5 mTorr, at least about 10 mTorr, at least about 20 mTorr, or at least about 50 mTorr. In certain aspects, the vacuum pressure within the container is less than or equal to about 100 mTorr, less than or equal to about 50 mTorr, less than or equal to about 20 mTorr, less than or equal to about 10 mTorr, less than or equal to about 5 mTorr, less than or equal to about 2 mTorr, or less than or equal to about 1 mTorr. Combinations of the above-referenced ranges are also possible (e.g., between about 0.5 mTorr and about 100 mTorr). Other ranges are also possible.

As described herein, in some aspects a layer (e.g., a second layer such as a protective layer) is formed by a method involving aerosol deposition of particles. Aerosol deposition, as described herein, generally results in the collision and/or elastic deformation of at least some of the plurality of particles. In some aspects, aerosol deposition can be carried out under conditions (e.g., using a velocity) sufficient to cause fusion of at least some of the plurality of particles to at least another portion of the plurality of particles.

In some aspects, a process described herein for forming a second layer can be carried out such that the bulk properties of the precursor materials (e.g., particles) are maintained in the resulting layer (e.g., crystallinity, ion-conductivity). In some cases, the use of aerosol deposition permits the deposition of particles formed of certain materials (e.g., ceramics) not feasible using other deposition techniques (e.g., vacuum deposition). For example, vacuum deposition (e.g., such as sputtering, e-beam evaporation) typically involves relatively high temperatures that would cause some ceramic materials to lose their bulk properties (e.g., crystallinity and/or ion conductivity) upon deposition. In other aspects, vacuum deposition of certain materials leads to cracking of the resulting layer because such materials may have desirable mechanical properties in the crystalline state which are lost during vacuum deposition (e.g., as amorphous films) resulting in crack formation and/or mechanical stresses formed in the layer (e.g., as a result of strength and/or thermal characteristic mismatch between the substrate and the layer). In certain cases, tempering of the material may not be possible after vacuum deposition for at least the aforementioned reasons. Since aerosol deposition can be carried out at relatively lower temperatures, e.g., compared to certain vacuum deposition techniques, certain materials (e.g., crystalline materials) that are typically incompatible with forming an-ion conductive layer/protective layer can now be used.

In one exemplary method, and referring to FIG. 2A, forming a second layer (e.g., a protective layer such as an ion-conductive layer or a non-ionically conductive layer) may involve providing a first layer 120 (e.g., an electroactive layer or other layer described herein) as a substrate for the formation of the second layer. Particles 140 (e.g., inorganic particles) may be deposited by any suitable method (e.g., aerosol deposition). Referring now to FIG. 2B, particles 140 may be deposited (as indicated by the arrow) on first layer 120. The deposition of the particles may cause the particles to be at least partially embedded within the first layer. In certain aspects, the particles are deposited at a sufficient velocity such that at least some of the particles come into direct contact with and/or are at least partially embedded within the first layer. In some aspects, the particles are deposited at a sufficient velocity such that at least some of the plurality of particles are at least partially embedded within the first layer and at least some of the particles are fused (FIG. 2B).

Advantageously, in some embodiments, the deposition of particles on the first layer as described herein (e.g., to form a second layer, such as a protective layer) breaks up any passivation layer that may be present on the surface of the first layer, which may result in increased direct contact between the deposited layer (e.g., the second layer) and a surface of the first layer (e.g., as compared to protective layers which have been transferred onto the first layer or deposited via chemical vapor deposition). By way of example, in some embodiments, a passivation layer, e.g., comprising lithium chloride, may be present on the surface of the first layer (e.g., lithium metal) and, during deposition of particles on the first layer as described herein, at least a portion of the passivation layer may be removed such that at least a portion of the deposited particles are in direct contact with the first layer.

In some aspects, at least a portion of the plurality of particles of a second layer such as a protective layer, or at least a portion of the surfaces of the plurality of particles, are in contact (e.g., direct contact) with a first layer (e.g., an electroactive layer or other layer described herein). This configuration can allow transport of ions (e.g., metal ions, such as lithium ions) directly from the particles to the first layer. In some cases, at least a portion of the plurality of particles is embedded within the first layer. For example, in some cases, at least about 0.1 vol % of the particles of a layer (e.g., a second layer) is embedded within the first layer. In some aspects, at least about 1 vol %, at least about 5 vol %, or at least about 10 vol %, or at least 20 vol % of the particles is embedded within the first layer. In certain aspects, less than or equal to about 25 vol %, less than or equal to about 20 vol %, less than or equal to about 15 vol %, or less than or equal to about 10 vol % of the particles is embedded within the first layer. Combinations of the above-referenced ranges are also possible (e.g., between about 0.1 vol % and about 25 vol %). Other ranges are also possible. Methods for determining the volume percentage of particles within a layer are known within the art and may include, in some aspects, dissecting a protective layer and imaging with, for example, a scanning electron microscope.

In some embodiments, the first layer (e.g., an electroactive layer, separator, or other layer described herein) may be coated (e.g., pre-coated) prior to deposition of the plurality of particles onto the first layer. For example, in some embodiments, the first layer may be pre-coated with a polymer, a ceramic (e.g., $Al_2O_3$, boehmites such as those having the general formula AlO(OH) or derivatives thereof), or combinations thereof. In one example, the first layer may be a separator comprising a polymeric material, and may include a coating on a surface of the separator as described herein. In some embodiments, the coating may comprise a plurality of ceramic particles embedded in a polymer. In some cases, the presence of a coating on the first layer may permit the deposition of particles having a relatively higher hardness compared particles deposited on a first layer that is not pre-coated, all other factors being equal. Additionally or alternatively, the presence of a coating on the first layer may prevent or reduce undesirable damage to the first layer caused by the deposition of the plurality of particles. In some embodiments, at least a portion of the plurality of particles deposited by a method described herein may be at least partially embedded within the coating of the first layer and/or within the first layer itself.

A coating on the first layer, if present, may be formed of any suitable material. In some embodiments, the material used to form the coating may be formed of a substantially non- or low-lithium ion conductive material (e.g., having a lithium ion conductivity of less than or equal to about $10^{-6}$ S/cm, less than or equal to about $10^{-7}$ S/cm, or less than or equal to about $10^{-8}$ S/cm).

In some embodiments, the material (e.g., a first material) used to form the coating on the first layer has a higher hardness compared to a hardness of the material used to form the particles of the second layer (e.g., a second material). For example, the hardness of the first material may be at least 10%, at least 25%, at least 50%, at least 75%, at least 100%, at least 150%, at least 200%, at least 300%, at least 400%, or at least 500% higher than a hardness of the second material. In some embodiments, the hardness of the first material is less than or equal to 1000%, less than or equal to 700%, less than or equal to 500%, less than or equal to 200%, less than or equal to 100%, or less than or equal to 50% the hardness of the second material. Combinations of the above-referenced ranges are also possible. Other ranges are also possible.

In one particular example, an article for use in an electrochemical cell comprises a first layer comprising a coating, wherein the coating comprises a first material, and a second layer deposited on the first layer, wherein the second layer comprises a plurality of particles formed of a second material. The first material has a hardness greater (e.g., at least 10% and less than or equal to 1000% greater) than a hardness of the second material. At least a portion of the plurality of particles are fused to one another. The second layer may have an average thickness between about 0.1 microns and about 5 microns. The coating may have other features and ranges of properties as described herein (e.g., a low lithium ion conductivity, a low weight percentage with respect to the first layer).

A coating on the first layer (e.g., a first layer that is pre-coated) may be formed using any suitable technique. For example, in some embodiments, a vacuum deposition process (e.g., sputtering, CVD, thermal or e-beam evaporation) can be used. In other embodiments, the first layer can be coated by drawing and casting a material from a slurry or gel. In some embodiments, a coating can be formed using a deposition method as described herein (e.g., pre-coating the first layer via deposition of a first plurality of particles), and then a second layer comprising a second plurality of particles (e.g., different than the plurality of particles in the pre-coating) may be deposited on the coating comprising the first plurality of particles.

The percentage of the total weight of the coating (e.g., pre-coating, if present) compared to the total weight of the first layer on which the coating is deposited may be any suitable value. In some embodiments, the total weight of the coating (e.g., pre-coating) is at least 0.00001%, at least 0.0001%, at least 0.001%, at least 0.01%, at least 0.1%, at least 1%, or at least 10% of the total weight of the first layer. In some embodiments, the total weight of the coating (e.g., pre-coating) is less than or equal to 20%, less than or equal to 10%, less than or equal to 5%, less than or equal to 2%, less than or equal to 1%, less than or equal to 0.1%, less than or equal to 0.01%, less than or equal to 0.001%, or less than or equal to 0.0001% of the total weight of the first layer. Combinations of the above-referenced ranges are also possible. Other ranges are also possible. In some embodiments, the percentage is measured prior to cycling of a cell comprising the components (or prior to the $2^{nd}$, $4^{th}$, $6^{th}$, $8^{th}$, or $10^{th}$ cycle of the cell).

Certain conventional electrodes and/or electrochemical cells are made to include an electroactive layer and/or an protective layer that is as smooth as possible (e.g., prior to cycling), where such smoothness was thought to help increase cycle life (e.g., by reducing pitting or other deleterious effects). In particular aspects described herein, at least a portion of the particles used to form an protective layer are embedded in an electroactive material layer and result in a particular roughness of the electroactive material layer and/or protective layer. The electroactive material layer and/or protective layer may have a certain value or range of values of mean peak to valley roughness as described herein (e.g., prior to cycling). In some aspects, such roughness does not substantially negatively affect cycle life.

Figure 1C:
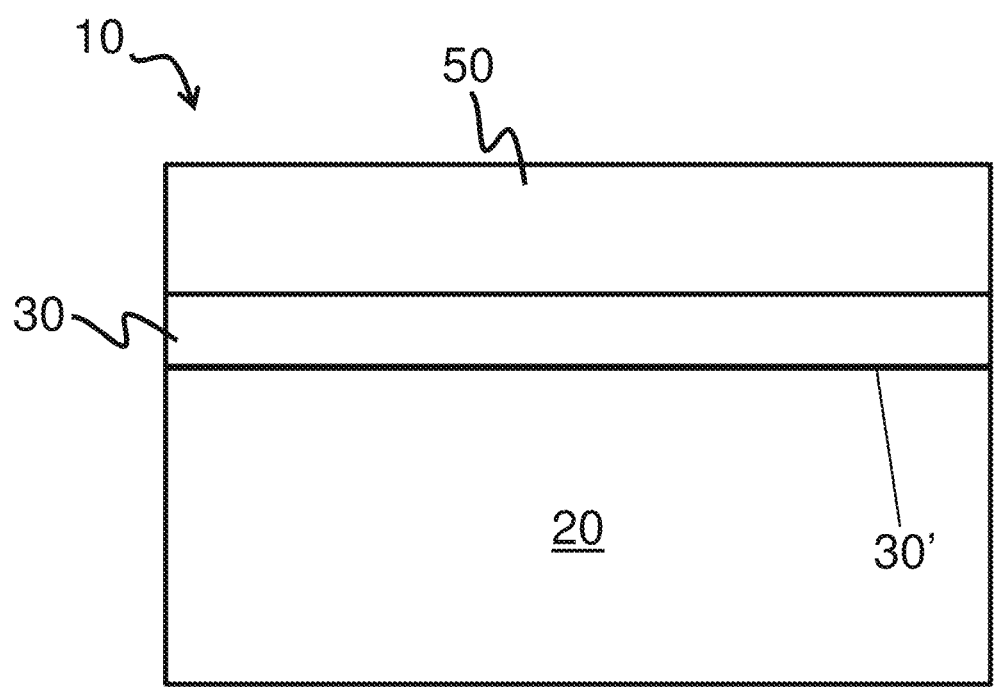
FIG. 1C is a schematic representation of a protective layer/resulting deposited layer (e.g., a second layer) deposited on an underlying layer and an electrolyte layer (e.g., a first layer), according to certain aspects.

As described herein, in some aspects, the second layer is a protective layer and/or a deposited layer. The protective or resulting deposited layer may include a first surface (e.g., in contact with a first layer, such as an electroactive layer) and a second surface opposing the first surface. In certain aspects, a surface (e.g., a second surface) of the protective layer or resulting deposited layer is in contact with an additional layer of an electrode or electrochemical cell (e.g., an optional electrolyte layer 50 in FIG. 1C). In some aspects, at least some of the particles (e.g., fused particles) comprises a first portion in direct contact with the electroactive layer at the first surface of the protective layer/resulting deposited layer, and a second portion at the second surface of the protective layer/resulting deposited layer. For example, the second portion of at least some of the fused particles at the second surface may be in direct contact with an electrolyte material (e.g., an electrolyte layer).

In some embodiments, the protective layer and/or the resulting deposited layer (second layer) is permeable to a liquid electrolyte (e.g., a liquid electrolyte to be used in an electrochemical cell including the protective layer). For example, in some aspects, the protective layer/resulting deposited layer absorbs (e.g., within the pores of the protective layer) greater than or equal to about 1 wt %, greater than or equal to about 5 wt %, greater than or equal to about 10 wt %, greater than or equal to about 20 wt %, or greater than or equal to about 25 wt % of a liquid electrolyte versus the total weight of the protective layer. In certain aspects, the protective layer/resulting deposited layer absorbs less than about 30 wt %, less than about 20 wt %, less than about 10 wt %, or less than about 5 wt % of a liquid electrolyte versus the total weight of the protective layer. Combinations of the above-referenced ranges are also possible (e.g., greater than or equal to about 1 wt % and less than or equal to about 30 wt %). Other ranges are also possible. Those skilled in the art would be capable of selecting suitable methods for determining the liquid electrolyte absorbed by the protective layer/resulting deposited layer including, for example, measuring the difference in weight of the protective layer/resulting deposited layer after absorbing the liquid electrolyte (e.g., after exposing the layer to the electrolyte for 1 hour at ambient temperature and pressure) versus the weight of the layer before absorbing the liquid electrolyte.

The particles of a protective layer and/or the resulting deposited layer described herein can be formed of a variety of types of materials. In certain aspects, the material from which the particles are formed may be selected to allow ions (e.g., electrochemically active ions, such as lithium ions) to pass through the material but to substantially impede electrons from passing across the material. By "substantially impedes", in this context, it is meant that in this aspect the material allows lithium ion flux at least ten times greater than electron passage. The particles may comprise, for example, an ion-conductive material (e.g., to facilitate the transfer of ions between materials on either side of the protective layer). Advantageously, such particles may be capable of conducting specific cations (e.g., lithium cations) while not conducting certain anions (e.g., polysulfide anions) and/or may be capable of acting as a barrier to an electrolyte and/or a polysulfide species for the electroactive layer.

In certain embodiments, the plurality of particles comprise ionically conductive particles (e.g., particles comprising or consisting of an ionically conductive material). In some embodiments, the plurality of particles comprise non-ionically conductive particles (e.g., comprising or consisting of a non-ionically conductive material).

In some embodiments, a first portion of the plurality of particles comprise a first type of material and a second portion of the plurality of particles comprise a second type of material. For example, in one embodiment, a first portion of the plurality of particles comprise ionically conductive particles (e.g., particles comprising or consisting of an ionically conductive material) and a second portion of the plurality of particles comprise non-ionically conductive particles (e.g., comprising or consisting of a non-ionically conductive material). In another embodiment, a first portion of the plurality of particles comprise ionically conductive particles (e.g., inorganic particles) and a second portion of the plurality of particles comprise polymeric particles. In yet another embodiment, a first portion of the plurality of particles comprise non-ionically conductive particles (e.g., inorganic particles) and a second portion of the plurality of particles comprise polymeric particles. In some instances, two different ionically-conductive materials may be used. In other embodiments, two non-ionically conductive materials may be present. In some cases, the plurality of particles may comprise a third portion comprising a third type of material. In some such embodiments, the first portion of the plurality of particles may comprise ionically conductive particles, the second portion of the plurality of particles comprise polymeric particles, and the third portion of the plurality of particles comprise non-ionically conductive particles. Other combinations are types of materials are also possible. In some aspects, the plurality of particles comprise more than one, more than two, or more than three types of particles (e.g., inorganic, polymeric, or combinations thereof). For instance, a layer may include at least 2, at least 3, at least 4 types of particles, wherein each of the types of particles are different.

In certain embodiments, the protective layer and/or the resulting deposited layer may comprise a first portion comprising fused particles and a second portion comprising unfused particles. For example, in some such embodiments, a plurality of particles may be deposited on an underlying layer such that at least a portion of the first portion of the plurality of particles fuse and such that the second portion of the plurality of particles do not substantially fuse. In an exemplary embodiment, a plurality of particles comprising ionically conductive particles and polymeric particles may be deposited on an underlying layer such that at least a portion of the ionically conductive particles fuse but the polymeric particles do not fuse.

In some aspects, the particles and/or a protective layer and/or the resulting deposited layer described herein comprise and/or are formed of an inorganic material. In certain aspects, the inorganic material comprises a ceramic material (e.g., glasses, glassy-ceramic materials). Non-limiting examples of suitable ceramic materials include oxides (e.g., aluminum oxide, silicon oxide, lithium oxide), nitrides, and/or oxynitrides of aluminum, silicon, zinc, tin, vanadium, zirconium, magnesium, indium, and alloys thereof, $Li_xMP_yS_z$ (where x, y, and z are integers, e.g., integers less than 32; and where M=Sn, Ge, or Si) such as $Li_{22}SiP_2S_{18}$, $Li_{24}SiP_2S_{19}$, or $LiMP_2S_{12}$ (e.g., where M=Sn, Ge, Si) and LiSiPS, garnets, crystalline or glass sulfides, phosphates, perovskites, anti-perovskites, other ion conductive inorganic materials and mixtures thereof. $Li_xMP_yS_z$ particles can be formed, for example, using raw components $Li_2S$, $SiS_2$ and $P_2S_5$ (or alternatively $Li_2S$, Si, S and $P_2S_5$), for example. In an exemplary embodiment, the ceramic material is $Li_{24}SiP_2S_{19}$. In another exemplary embodiment, the ceramic material is $Li_{22}SiP_2S_{18}$.

In some aspects, the particles of a protective layer, a protective layer itself, and/or the resulting deposited layer, may comprise a material including one or more of lithium nitrides, lithium nitrates (e.g., $LiNO_3$), lithium silicates, lithium borates (e.g., lithium bis(oxalate)borate, lithium difluoro(oxalate)borate), lithium aluminates, lithium oxalates, lithium phosphates (e.g., $LiPO_3$, $Li_3PO_4$), lithium phosphorus oxynitrides, lithium silicosulfides, lithium germanosulfides, lithium oxides (e.g., $Li_2O$, LiO, $LiO_2$, $LiRO_2$, where R is a rare earth metal), lithium fluorides (e.g., LIF, $LiBF_4$, $LiAlF_4$, $LiPF_6$, $LiAsF_6$, $LiSbF_6$, $Li_2SiF_6$, $LiSO_3F$, $LiN(SO_2F)_2$, $LiN(SO_2CF_3)_2$), lithium lanthanum oxides, lithium titanium oxides, lithium borosulfides, lithium aluminosulfides, and lithium phosphosulfides, oxy-sulfides (e.g., lithium oxy-sulfides) and combinations thereof. In some aspects, the plurality of particles may comprise $Al_2O_3$, $ZrO_2$, $SiO_2$, $CeO_2$, and/or $Al_2TiO_5$ (e.g., alone or in combination with one or more of the above materials). In a particular aspect, the plurality of particles may comprise Li—Al—Ti—$PO_4$ (LATP). The selection of the material (e.g., ceramic) will be dependent on a number of factors including, but not limited to, the properties of electrolyte and the anode and cathode used in the cell.

In some aspects, the particles of a protective layer, a protective layer itself, and/or the resulting deposited layer may comprise or consist of a polymeric material (e.g., a non-ionically conductive polymeric material and/or an ion-conductive polymeric material). Polymeric materials suitable for use in a protective layer and/or the resulting deposited layer (or as particles for forming a protective layer and/or the resulting deposited layer) are described in more detail below. In an exemplary embodiment, the polymeric material is polyethylene.

In some aspects, the particles of a protective layer, a protective layer itself, and/or the resulting deposited layer are/is substantially amorphous. In certain aspects, the particles, a protective layer and/or the resulting deposited layer described herein are/is substantially crystalline. In some cases, the particles, a protective layer and/or the resulting deposited layer described herein may be semi-crystalline. For example, in some aspects, the particles, a protective layer and/or the resulting deposited layer described herein may be at least about 1% crystalline, at least about 2% crystalline, at least about 5% crystalline, at least about 10% crystalline, at least about 25% crystalline, at least about 50% crystalline, at least about 75% crystalline, at least about 80% crystalline, at least about 90% crystalline, at least about 95% crystalline, at least about 98% crystalline, at least about 99% crystalline. In certain aspects, the particles, a protective layer, and/or the resulting deposited layer described herein may be 100% crystalline. In some aspects, the particles, a protective layer and/or the resulting deposited layer described herein may be less than or equal to about 99.9% crystalline, less than or equal to about 99.5% crystalline, less than or equal to about 99% crystalline, less than or equal to about 98% crystalline, less than or equal to about 95% crystalline, less than or equal to about 90% crystalline, less than or equal to about 80% crystalline, less than or equal to about 75% crystalline, less than or equal to about 50% crystalline, less than or equal to about 25% crystalline, less than or equal to about 10% crystalline, less than or equal to about 5% crystalline, or less than or equal to about 2% crystalline. Combinations of the above referenced ranges are also possible (e.g., between about 1% crystalline and 100% crystalline, between about 1% crystalline and about 99.9% crystalline). Those skilled in the art would be capable of selecting suitable methods for determining percent crystallinity including, for example, x-ray diffraction spectra of the particles, protective layer and/or the resulting deposited layer.

In some aspects, the particles of a protective layer and/or the resulting deposited layer may be selected to have a desirable ion conductivity. For example, in certain aspects, the particles may be conductive to ions of the electroactive material (e.g. lithium). In some cases, the particles may have an average ion conductivity (e.g., lithium ion conductivity) of at least about $10^{-6}$ S/cm. In certain aspects, the average ion conductivity (e.g., metal ion, such as lithium ion conductivity) of the particles within the protective layer and/or the resulting deposited layer is at least about $10^{-6}$ S/cm, at least about $10^{-5}$ S/cm, at least about $10^{-4}$ S/cm, at least about, or at least about $10^{-3}$ S/cm. In some aspects, the average ion conductivity of the particles is less than about $10^{-2}$ S/cm, less than about $10^{-3}$ S/cm, or less than about $10^{-4}$ S/cm. Combinations of the above-referenced ranges are also possible (e.g., an ion conductivity between about $10^{-2}$ S/cm and about $10^{-6}$ S/cm, between about $10^{-3}$ S/cm and about $10^{-5}$ S/cm). Other ion conductivities are also possible. Conductivity may be measured at room temperature (e.g., 25° C.).

In some embodiments, however, the protective layer and/or the resulting deposited layer may be substantially non-ionically conductive. In some such embodiments, the particles of the protective layer and/or the resulting deposited layer may have an average ion conductivity (e.g., lithium ion conductivity) of less than about $10^{-6}$ S/cm, less than about $10^{-7}$ S/cm, less than about $10^{-8}$ S/cm, or less than about $10^{-9}$ S/cm. In some embodiments, the particles of the protective layer and/or the resulting deposited layer may have an average ion conductivity of greater than about $10^{-10}$ S/cm, greater than about $10^{-9}$ S/cm, greater than about $10^{-8}$ S/cm, or greater than about $10^{-7}$ S/cm. Combinations of the above referenced ranges are also possible (e.g., an ion conductivity between about $10^{-10}$ S/cm and about $10^{-6}$ S/cm). Other ranges are also possible.

In certain aspects, the particles may have an electronic conductivity of less than about $10^{-10}$ S/cm. For example, in some aspects, the electronic conductivity of the particles is less than or equal to about $10^{-11}$ S/cm, less than or equal to about $10^{-12}$ S/cm, less than or equal to about $10^{-13}$ S/cm, less than or equal to about $10^{-14}$ S/cm, less than or equal to about $10^{-15}$ S/cm, less than or equal to about $10^{-17}$ S/cm, or less than or equal to about $10^{-19}$ S/cm. Other values and ranges of electronic conductivity are also possible.

In some aspects, the average ion conductivity of the particles can be determined before the particles are incorporated into the protective layer. The average ionic conductivity can be measured by pressing the particles between two copper cylinders at a pressure of up to 3 tons/cm². In certain aspects, the average ion conductivity (i.e., the inverse of the average resistivity) can be measured at 500 kg/cm² increments using a conductivity bridge (i.e., an impedance measuring circuit) operating at 1 kHz. In some such aspects, the pressure is increased until changes in average ion conductivity are no longer observed in the sample.

It may be advantageous for the particles to comprise a material that is chemically stable when in contact with one or more layers of the electrochemical cell. Generally, particles are chemically stable if the material forming the particles does not react chemically (e.g., form a byproduct) with a component of one or more materials that may come in direct contact with the particles. For example, in certain aspects, the particles are chemically stable when in contact with the electroactive material, when in contact with the polymeric material, when in contact with an electrolyte material, and/or when in contact with a polysulfide.

In some aspects, the protective layer and/or the resulting deposited layer includes between about 50 wt % and about 100 wt % of an ionically conductive material. In certain aspects, the protective layer comprises ionically conductive particles (e.g., comprising ionically conductive material wherein at least a portion of the particles may fused) in an amount greater than or equal to about 50 wt %, greater than or equal to about 60 wt %, greater than or equal to about 65 wt %, greater than or equal to about 70 wt %, greater than or equal to about 75 wt %, greater than or equal to about 80 wt %, greater than or equal to about 85 wt %, greater than or equal to about 90 wt %, greater than or equal to about 95 wt %, greater than or equal to about 97 wt %, greater than or equal to about 98 wt %, or greater than or equal to about 99 wt % of the total composition of the protective layer. In some aspects, the weight percentage of the ionically conductive particles (e.g., comprising ionically conductive material wherein at least a portion of the particles may fused) in the protective layer is less than about 99.9 wt %, less than or equal to about 99.5 wt %, less than about 99 wt %, less than about 98 wt %, less than about 97 wt %, less than about 95 wt %, less than about 90 wt %, less than about 85 wt %, less than or equal to about 80 wt %, less than or equal to about 75 wt %, less than or equal to about 70 wt %, less than or equal to about 65 wt %, or less than or equal to about 60 wt % of the total composition of the protective layer. Combinations of the above-reference ranges are also possible (e.g., between about 50 wt % and about 99.9 wt %, between about 70 wt % and about 95 wt %, between about 75 wt % and about 90 wt %). Other ranges are also possible. Methods for determining the weight percentage of particles within a layer are known within the art and may include, in some aspects, weighing the particles before the formation of the protective layer and/or the resulting deposited layer.

In certain embodiments, the protective layer and/or the resulting deposited layer does not comprise substantially any non-ionically conductive material (e.g., the protective layer comprises 100 wt % ionically conductive material). In some embodiments, however, the protective layer includes substantially no ionically conductive material and/or the resulting deposited layer.

In some embodiments, the protective layer and/or the resulting deposited layer includes between about 10 wt % and about 99.9 wt % of a non-ionically conductive material. In certain aspects, the protective layer comprises non-ionically conductive particles (e.g., comprising non-ionically conductive material wherein at least a portion of the particles may fused) in an amount greater than or equal to about 10 wt %, greater than or equal to about 20 wt %, greater than or equal to about 30 wt %, greater than or equal to about 40 wt %, greater than or equal to about 50 wt %, greater than or equal to about 60 wt %, greater than or equal to about 70 wt %, greater than or equal to about 80 wt %, greater than or equal to about 90 wt %, greater than or equal to about 95 wt %, greater than or equal to about 97 wt %, greater than or equal to about 98 wt %, or greater than or equal to about 99 wt % of the total composition of the protective layer and/or the resulting deposited layer (second layer). In certain embodiments, the protective layer and/or the resulting deposited layer comprises non-ionically conductive particles (e.g., comprising non-ionically conductive material wherein at least a portion of the particles may fused) in an amount less than about 99.9 wt %, less than or equal to about 99.5 wt %, less than about 99 wt %, less than about 98 wt %, less than about 97 wt %, less than about 95 wt %, less than about 90 wt %, less than about 80 wt %, less than or equal to about 70 wt %, less than or equal to about 60 wt %, less than or equal to about 50 wt %, less than or equal to about 40 wt %, less than or equal to about 30 wt %, or less than or equal to about 20 wt % of the total composition of the protective layer and/or the resulting deposited layer. Combinations of the above-reference ranges are also possible (e.g., between about 10 wt % and about 99.9 wt %, between about 20 wt % and about 30 wt %, between about 25 wt % and about 50 wt %, between about 25 wt % and about 75 wt %, between about 70 wt % and about 95 wt %, between about 75 wt % and about 90 wt %). Other ranges are also possible.

In some aspects, a polymeric material is present in the protective layer and/or the resulting deposited layer in an amount of at least about 5 wt %, at least about 10 wt %, at least about 20 wt %, or at least about 25 wt %. In certain aspects, the polymeric material is present in the protective layer and/or the resulting deposited layer is less than or equal to about 30 wt %, less than or equal to about 25 wt %, less than or equal to about 20 wt %, less than or equal to about 15 wt %, or less than or equal to about 10 wt %. Combinations of the above referenced ranges are also possible (e.g., between about 5 wt % and about 30 wt %). Other ranges are also possible. In some cases, the protective layer and/or the resulting deposited layer comprises substantially no polymeric material.

As described herein, aerosol deposition of particles may be used to form a protective layer and/or the resulting deposited layer on a substrate as described herein. In certain aspects, the difference between the hardness of the particles and the hardness of the substrate on which the particles are deposited (e.g., a first layer, a coating on the first layer) may be less than or equal to 500%, less than or equal to 400%, less than or equal to 300%, less than or equal to 200%, less than or equal to 100%, less than or equal to 80%, less than or equal to 60%, less than or equal to 40%, less than or equal to 20%, less than or equal to 10%, or less than or equal to 5%. In some aspects, the difference in hardness may be at least 0.01%, at least 0.1%, at least 1%, at least 5%, at least 10%, at least 50%, at least 100%, at least 200%, at least 300%. Combinations of the above-referenced ranges are also possible. The difference may be calculated by subtracting the smaller value of hardness from the larger value of hardness, dividing by the larger value of hardness, and multiplying by 100. Those skilled in the art would be capable of selecting suitable methods for determining hardness of the materials described herein, including, for example, nano-indentation.

In some aspects in which the resulting deposited layer includes a polymeric material, the polymeric material is deposited (e.g., aerosol deposited) on a first layer. In certain aspects, particles (e.g., polymer particles) comprising the polymeric material is deposited on the first layer. The polymer material may be deposited substantially simultaneously with deposition of the ionically conductive material and/or the ionically non-conductive material (e.g., the particles may be mixed prior to deposition, or may be introduced from different sources onto the same substrate).

In other aspects, the polymeric particles may be deposited on the first layer prior to deposition of the particles of ionically-conductive material and/or non-ionically conductive material. For instance, after forming a first layer comprising a polymeric material (which may be deposited by aerosol deposition, or by any other suitable method for forming a polymeric layer, such as a coating method) the inorganic particles may be deposited on and/or into the polymeric material. In certain aspects, the inorganic particles may be deposited after and onto/into the polymer material such that at least a portion of the inorganic particles fuse.

In some aspects involving depositing inorganic (e.g., ceramic) particles onto a polymeric layer, a gradient in the density of the inorganic material/particles across the thickness of the layer may be formed. For instance, in one method and/or article, a polymeric layer is positioned on a first layer (e.g., a substrate). The polymeric material may be in any suitable form (e.g., a gel, a solid). Then, inorganic particles may be deposited onto the polymeric layer (e.g., by aerosol deposition). The resulting structure (second layer) may be a composite of the inorganic particles and the polymeric material, with the density of inorganic material increasing across at least a portion (or substantially all of) the thickness of the resulting structure from the first layer to the outer surface of the resulting structure (second layer). Such a structure may be formed, in some aspects, by increasing the velocity of the inorganic particles gradually throughout deposition. In some instances, the deposition occurs such that at least a portion of the inorganic particles fuse. For instance, the particles/inorganic material at the outer surface of the resulting structure may be substantially fused, while the particles/inorganic material adjacent the first surface may remain substantially unfused, partially fused, or fused to a lesser extent compared to that at the outer surface. In other aspects, the reverse gradient can be formed.

Methods and conditions (e.g., velocity, pressures, etc.) for depositing materials are described in detail herein.

Any suitable polymeric material can be included in a protective layer and/or the resulting deposited layer. In some aspects, the polymeric material may include or consist essentially of one or more polymeric materials. The polymeric material may, in some aspects, be a monomer, a mixture of copolymers, block copolymers, or a combination of two or more polymers that are in an interpenetrating network or semi-interpenetrating network. In alternative aspects, the polymeric material may comprise a filler and/or solid additive. The filler and/or solid additive may add strength, flexibility, and/or improved adhesion properties to the polymer. In some aspects, the polymer may comprise a plasticizer or other additives, including solid phase change materials. Addition of plasticizers may increase flexibility of the polymer and improve thixotropic properties. Addition of solid phase change materials may result in addition of materials that melt at elevated temperatures and thereby act as a heat sink and prevent thermal runaway.

In some aspects, the polymeric material may be selected to be flexible. Nano-hardness studies may be conducted to measure creep and/or hardness and thereby assess the flexibility and/or brittleness of a polymeric material. In certain cases, the polymeric material may be selected to be thermally stable above 100° C., 150° C., 200° C., 250° C., 300° C., 350° C., or 400° C. Thermal stability may be assessed by differential scanning calorimetry (DSC). Non-limiting examples of polymeric materials that may exhibit thermal stability at elevated temperatures include polysiloxanes, polycyanurates, and polyisocyanurates.

The polymeric material may, in certain cases, be selected to be substantially inert to the electrolyte solution and/or to Li polysulfide attack. A means of determining the stability of a polymeric material in an electrolyte solution includes exposing a small sample of the polymeric material to vapors of an electrolyte solvent, or to the electrolyte solvent itself. Examples of polymeric materials that may be stable in an electrolyte solution include, but are not limited to, polyurethanes and polysiloxanes. Additional tests that may be conducted on polymeric materials to examine various characteristics include Fourier transform infrared spectroscopy (FTIR) to confirm that a polymeric material is cured or cross-linked, scanning electron microscopy with energy dispersive x-ray spectroscopy (SEM-EDS) to determine whether a polymeric material has cracks. Such test and other tests can also be used to determine whether a protective layer and/or the resulting deposited layer comprises discrete layers, interpenetrating networks, or semi-interpenetrating networks. Profilometry can be used to assess how rough the surface of a polymeric material is.

Other classes of polymeric materials that may be suitable for use in a protective layer and/or the resulting deposited layer (e.g., as particles to be fused during formation of the protective layer) include, but are not limited to, polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamides, poly(acrylates), poly(methacrylates), poly (2-vinyl pyridine), poly(N-vinylpyrrolidone), poly(methylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly (isohexylcynaoacrylate)); polyacetals; polyolefins (e.g., poly(butene-1), poly(n-pentene-2), polyethylene, polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some aspects, the polymeric material may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known.

Accordingly, those of ordinary skill in the art can choose suitable polymeric materials based on their mechanical and/or electronic properties (e.g., ionic and/or electronic conductivity), and/or can modify such polymeric materials to be ionically conducting (e.g., conductive towards single ions) and/or electronically non-conducting based on knowledge in the art, in combination with the description herein. As described herein, in some aspects the polymeric material is substantially non-ionically conductive. However, in other aspects in which it is desirable for the polymeric material to be ionically conductive (e.g., particles comprising such ionically conductive polymeric materials), the polymeric materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity. Salts may be added to the material in a range of, e.g., 0 to 50 mol %. In certain aspects, salts are included in at least 5 mol %, at least 10 mol %, at least 20 mol %, at least 30 mol %, at least 40 mol %, or at least 50 mol % of the material. In certain aspects, additional salts are less than or equal to 50 mol %, less than or equal to 40 mol %, less than or equal to 30 mol %, less than or equal to 20 mol %, or less than or equal to 10 mol % of the material. Combinations of the above-noted ranges are also possible. Other values of mol % are also possible.

In certain aspects, the average ionic conductivity of the polymeric material may be less than or equal to about $10^{-3}$ S/cm, less than or equal to about $10^{-4}$ S/cm, less than or equal to about $10^{-5}$ S/cm, less than or equal to about $10^{-6}$ S/cm, or less than or equal to about $10^{-7}$ S/cm. In some aspects, the average ionic conductivity of the polymeric material of a protective layer and/or the resulting deposited layer is at least about $10^{-8}$ S/cm, at least about $10^{-7}$ S/cm, at least about $10^{-6}$ S/cm, at least about $10^{-5}$ S/cm, at least about $10^{-4}$ S/cm, or at least about $10^{-3}$ S/cm. Combinations of the above-referenced ranges are also possible (e.g., an average ionic conductivity in the electrolyte of at least about $10^{-8}$ S/cm and less than or equal to about $10^{-6}$ S/cm). Conductivity may be measured at room temperature (e.g., 25° C.).

In some aspects, the polymeric material may be substantially non-ionically conductive and substantially non-electrically conductive. For example, non-electrically conductive materials (e.g., electrically insulating materials) such as those described herein can be used. In other aspects, the polymeric material may be ionically conductive but substantially non-electrically conductive. Examples of such polymeric materials include non-electrically conductive materials (e.g., electrically insulating materials) that are doped with lithium salts, such as acrylate, polyethylene oxide, silicones, and polyvinyl chlorides.

In some aspects, the polymeric material included in a composite is substantially non-swellable in an electrolyte solvent to be used in an electrochemical cell including such a protective layer and/or resulting deposited layer. For instance, the polymeric material and/or layer may experience a volume change of less than 10%, less than 8%, less than 6%, less than 5%, less than 4%, less than 2%, or less than 1% when in contact with an electrolyte solvent (including any salts or additives present) to be used in an electrochemical cell including such a protective layer for at least 24 hours. In some aspects, the polymeric material (e.g., the gel comprising the polymeric material) and/or layer may increase in volume (i.e. swell) in the presence of the liquid electrolyte by at least about 0.01 vol %, at least about 0.1 vol %, at least about 0.2 vol %, at least about 0.5 vol %, at least about 1 vol %, or at least about 2 vol %. Combinations of the above referenced ranges are also possible (e.g., between about 0.01 vol % and about 5 vol %). Simple screening tests of such polymers can be conducted by placing pieces of polymer in the electrolyte solvent (including any salts or additives present) and measuring the weight or volume change of the polymer pieces before and after a 24 hour period, and determining the percentage change in volume relative to the volume before placement in the solvent.

It may be advantageous, in some aspects, for the polymeric material to comprise or be formed of a material that is chemically stable when in contact with one or more layers of the electrochemical cell (e.g., an electrolyte layer). The polymeric material may be chemically stable if, for example, the material does not react chemically (e.g., form a byproduct) with a component of one or more additional layers of the electrochemical cell in direct contact with the polymeric material. For example, in certain aspects, the polymeric material is chemically stable when in contact with the electroactive material, when in contact with an electrolyte material, and/or when in contact with a polysulfide. In certain aspects, the polymeric material may form a reaction product with the components of the electrode for electrochemical cell (e.g., an electroactive material, an electrolyte material (e.g., a species within the electrolyte), and/or a polysulfide); however, in such aspects, the reaction product does not interfere with the function of a layer including the polymeric material (e.g., the layer remains ionically conductive).

In certain aspects, the polymeric material may be substantially non-cross-linked. However, in other aspects, the polymeric material is cross-linked. In some such aspects, the polymeric material may be cross-linked with a portion of the plurality of particles. For example, in some aspects, a portion of the plurality of particles may be coated with a cross-linking polymer (e.g., bound to the surface of a portion of the plurality of particles). Cross-linking can be achieved by, for example, adding cross-linker to a polymer and performing a cross-linking reaction, e.g., by thermal or photochemical curing, e.g. by irradiation with such as UV/vis irradiation, by γ-irradiation, electron beams (e-beams) or by heating (thermal cross-linking). Examples of cross-linkers may include ones selected from molecules with two or more carbon-carbon double bonds, e.g., ones with two or more vinyl groups. Particularly useful cross-linkers are selected from di(meth)acrylates of diols such as glycol, propylene glycol, diethylene glycol, dipropylene glycol, 1,3-propanediol, 1,4-butanediol, triethylene glycol, tetrapropylene glycol, cyclopentadiene dimer, 1,3-divinyl benzene, and 1,4-divinyl benzene. Some suitable cross-linkers may comprise two or more epoxy groups in the molecule, such as, for example, bis-phenol F, bis-phenol A, 1,4-butanediol diglycidyl ether, glycerol propoxylate triglycidyl ether, and the like.

In some aspects, the polymeric material and/or the resulting deposited layer may be in the form of a gel. In some aspects, the polymeric material and/or the resulting deposited layer forms a polymer gel when exposed to a liquid electrolyte. In certain aspects, the polymeric material may swell in the presence of a liquid electrolyte. For example, in some aspects, the polymeric material (e.g., the gel comprising the polymeric material) and/or layer may increase in volume (i.e. swell) in the presence of the liquid electrolyte by at least about 20 vol %, at least about 30 vol %, at least about 40 vol %, at least about 50 vol %, at least about 60 vol %, at least about 70 vol %, at least about 80 vol %, or at least about 90 vol %. In certain aspects, the polymeric material and/or layer may increase in volume (i.e. swell) in the presence of a liquid electrolyte by less than or equal to about 200 vol %, less than or equal to about 100 vol %, less than or equal to about 80 vol %, less than or equal to about 60 vol %, less than or equal to about 40 vol %, or less than or equal to about 20 vol %. Combinations of the above referenced ranges are also possible (e.g., between about 50 vol % and about 100 vol %). Simple screening tests of such polymer gels can be conducted by placing pieces of polymer gel in the electrolyte solvent (including any salts or additives present) and measuring the weight or volume change of the gel pieces before and after a 24 hour period, and determining the percentage change in volume relative to the volume before placement in the solvent.

In some aspects, the plurality of particles comprise a material having a particular Young's elastic modulus. In some aspects, the Young's elastic modulus of the plurality of particles is at least about 0.1 GPa, at least about 0.5 GPa, at least about 1 GPa, at least about 2 GPa, at least about 5 GPa, at least about 10 GPa, at least about 20 GPa, at least about 50 GPa, at least about 100 GPa, at least about 200 GPa, or at least about 400 GPa. In certain aspects, the Young's elastic modulus of the plurality of particles is less than or equal to about 500 GPa, less than or equal to about 400 GPa, less than or equal to about 200 GPa, less than or equal to about 100 GPa, less than or equal to about 50 GPa, less than or equal to about 20 GPa, less than or equal to about 10 GPa, less than or equal to about 5 GPa, less than or equal to about 2 GPa, less than or equal to about 1 GPa, or less than or equal to about 0.5 GPa. Combinations of the above-referenced ranges are also possible (e.g., between about 0.1 GPa and about 500 GPa). In a particular aspect, the Young' elastic modulus of the particles is at least about 1 GPa. In certain aspects, the Young's elastic modulus of the fused particles is substantially the same as the Young's elastic modulus as the particles prior to fusion. The Young's elastic modulus may be measured by nano-indentation (AFM).

In certain aspects, the additional or second material (e.g., a polymeric material) comprised by the second layer (e.g., protective layer/resulting deposited layer) has a Young's elastic modulus that is at least about 2 times, at least about 5 times, at least about 10 times, at least about 20 times, at least about 50 times, or at least about 100 times less than the Young's elastic modulus of the particles (e.g., fused particles) used to form and/or present in the protective layer and/or the resulting deposited layer. The additional or second material (e.g., the polymeric material) may have a Young's elastic modulus that is less than or equal to about 100 times, less than or equal to about 50 times, less than or equal to about 10 times the Young's elastic modulus of the particles (e.g., fused particles) used to form and/or present in the protective layer and/or the resulting deposited layer. Combinations of the above-referenced ranges are also possible. Those skilled in the art would be capable of selecting suitable methods for determining Young's elastic modulus of the materials described herein.

In certain aspects, the additional or second material (e.g., the polymeric material) has a yield strength that is at least about 2, at least about 5, at least about 10, or at least about 100 times less than the yield strength of the particles (e.g., fused particles, and/or inorganic particles) used to form and/or present in the protective layer and/or the resulting deposited layer. The additional or second material (e.g., the polymeric material) may have a yield strength that is less than or equal to about 100 times, less than or equal to about 50 times, less than or equal to about 10 times the yield strength of the particles (e.g., fused particles) used to form and/or present in the protective layer and/or the resulting deposited layer. Combinations of the above-referenced ranges are also possible. Those skilled in the art would be capable of selecting suitable methods for determining yield strength of the materials described herein, including, for example, nanoindentation.

In some aspects, the weight ratio of non-ionically conductive material (e.g., comprising the plurality of particles) and ionically conductive material (e.g., comprising a second material such as a polymeric material) present in protective layer/resulting deposited layer is between about 80:20 and about 95:5, although other ranges are also possible. In some aspects, the weight ratio of non-ionically conductive material and ionically conductive material is at least about 70:30, at least about 80:20, at least about 85:15, or at least about 90:10. In some aspects, the weight ratio of non-ionically conductive material and ionically conductive material is less than or equal to about 95:5, less than or equal to about 90:10, or less than or equal to about 85:15. Combinations of the above-referenced ranges are also possible (e.g., between about 80:20 and about 95:5).

A protective layer and/or the resulting deposited layer (second layer) comprising a plurality of particles (e.g., fused particles) may have any suitable thickness. In some aspects, a protective layer and/or the resulting deposited layer described herein may have an average thickness of at least about 0.1 microns, at least about 0.2 microns, at least about 0.4 microns, at least about 0.5 microns, at least about 0.6 microns, at least about 0.8 microns, 1 micron, at least about 3 microns, at least about 5 microns, at least about 10 microns, at least about 15 microns, or at least about 20 microns. In some aspects, the average thickness of the protective layer and/or the resulting deposited layer is less than or equal to about 25 microns, less than or equal to about 20 microns, less than or equal to about 10 microns, less than or equal to about 5 microns, less than or equal to about 3 microns, less than or equal to about 1 micron, less than or equal to about 0.8 microns, less than or equal to about 0.6 microns, less than or equal to about 0.5 microns, less than or equal to about 0.4 microns, or less than or equal to about 0.2 microns. Other ranges are also possible. Combinations of the above-noted ranges are also possible (e.g., between about 0.1 microns and about 25 microns, between about 0.1 microns and about 3 microns, between about 1 micron and about 5 microns, between about 3 microns and about 25 microns, between about 5 microns and about 10 microns). The average thickness of the protective layer can be determined, for example, using a drop gauge or scanning electron microscopy (SEM), as described above.

In some aspects, the protective layer and/or the resulting deposited layer may be substantially porous (e.g., have a relatively high porosity). For instance, in some cases, the plurality of particles are deposited on the first layer (optionally with an additional/second material) and form a protective layer and/or the deposited layer that is substantially porous. In certain aspects, the protective layer and/or the resulting deposited layer may have a porosity of at least about 25%, at least about 50%, at least about 75%, at least about 80%, at least about 90%, at least about 95%, at least about 97%, at least about 98%, at least about 99%, or at least about 99.5%. In some aspects, the protective layer and/or the resulting deposited layer may have a porosity of less than or equal to about 99.9%, less than or equal to about 99.5%, less than or equal to about 99%, less than or equal to about 98%, less than or equal to about 97%, less than or equal to about 95%, less than or equal to about 90%, less than or equal to about 80%, less than or equal to about 75%, or less than or equal to about 50%. Combinations of the above-referenced ranges are also possible (e.g., at least about 25% and less than or equal to about 99.9%). Other ranges are also possible. Porosity can be determined, for example, by mercury porosimetry (e.g., Brunauer-Emmett-Teller porosity).

In embodiments in which the protective layer and/or the resulting deposited layer is porous, the layer may have any suitable pore size. In some embodiments, the pore size of the protective layer and/or the resulting deposited layer is less than or equal to 2 microns, less than or equal to 1 micron, less than or equal to 500 nm, less than or equal to 300 nm, less than or equal to 100 nm, less than or equal to 50 nm, or less than or equal to 25 nm. In some embodiments, the pore size may be greater than or equal to 10 nm, greater than or equal to 50 nm, greater than or equal to 100 nm, greater than or equal to 300 nm, greater than or equal to 500 nm, greater than or equal to 700 nm, or greater than or equal to 1 micron. Other values are also possible. Combinations of the above-noted ranges are also possible (e.g., a pore size of less than 1 micron and greater than or equal to 10 nm).

In some aspects, an electrochemical cell including a protective layer described herein and/or the resulting deposited layer may have a particular initial impedance. In some embodiments, the electrochemical cell including the protective layer may have an initial impedance of less than 5 Ohms, less than 4 Ohms, less than 3 Ohms, less than 2 Ohms, less than 1 Ohm, less than 0.75 Ohms, or less than 0.5 Ohms. In certain embodiments, the electrochemical cell including the protective layer may have an initial impedance of greater than or equal to 0.25 Ohms, greater than or equal to 0.5 Ohms, greater than or equal to 0.75 Ohms, greater than or equal to 1 Ohm, greater than or equal to 2 Ohms, greater than or equal to 3 Ohms, or greater than or equal to 4 Ohms. Combinations of the above-referenced ranges are also possible (e.g., less than 5 Ohms and greater than or equal to 0.25 Ohms, less than 2 Ohms and greater than or equal to 0.25 Ohms). Other ranges are also possible. Initial impedance as described herein may be determined using a conductivity bridge (i.e., an impedance measuring circuit) operating at 1 kHz after cell construction but before start of cycling.

In certain aspects, an electrochemical cell including the protective layer and/or the resulting deposited layer has an initial impedance that is less than the initial impedance of an otherwise substantially identical electrochemical cell without the protective layer/resulting deposited layer. For example, in some embodiments, an electrochemical cell including the protective layer and/or the resulting deposited layer has an initial impedance that is at least 2 times, at least 3 times, at least 5 times, at least 7 times, or at least 10 times the initial impedance of an otherwise substantially identical electrochemical cell without the protective layer/resulting deposited layer. In certain embodiments, an electrochemical cell including the protective layer and/or the resulting deposited layer has an initial impedance that is less than 20 times, less than 10 times, less than 7 times, less than 5 times, or less than 3 times the initial impedance of an otherwise substantially identical electrochemical cell without the protective layer. Combinations of the above-referenced ranges are also possible (e.g., at least 2 times and less than 20 times). Other ranges are also possible.

The protective layer and/or the resulting deposited layer may have any suitable density. In certain aspects, the density of the protective layer and/or the resulting deposited layer is between about 1.5 g/cm$^3$ and about 6 g/cm$^3$. For example, in some aspects, the protective layer and/or the resulting deposited layer has a density of at least about 1.5 g/cm$^3$, at least about 2 g/cm$^3$, at least about 2.5 g/cm$^3$, at least about 3 g/cm$^3$, at least about 4 g/cm$^3$, or at least about 5 g/cm$^3$. In certain aspects, the protective layer and/or the resulting deposited layer has a density of less than or equal to about 6 g/cm$^3$, less than or equal to about 5 g/cm$^3$, less than or equal to about 4 g/cm$^3$, less than or equal to about 3 g/cm$^3$, less than or equal to about 2.5 g/cm$^3$, or less than or equal to about 2 g/cm$^3$. Combinations of the above-referenced ranges are also possible (e.g., between about 1.5 g/cm$^3$ and about 6 g/cm$^3$). Other ranges are also possible.

In certain aspects, the protective layer and/or the resulting deposited layer has an overall ionic conductivity (e.g., lithium ion conductivity) of at least about at least about $10^{-7}$ S/cm, at least about $10^{-6}$ S/cm, at least about $10^{-5}$ S/cm, at least about $10^{-4}$ S/cm, or at least about $10^{-3}$ S/cm. In certain aspects, the average ionic conductivity (e.g., lithium ion conductivity) of the protective layer and/or the resulting deposited layer may be less than or equal to about less than or equal to about $10^{-2}$ S/cm, less than or equal to about $10^{-3}$ S/cm, less than or equal to about $10^{-4}$ S/cm, less than or equal to about $10^{-5}$ S/cm, or less than or equal to about $10^{-6}$ S/cm. Combinations of the above-referenced ranges are also possible (e.g., an average ionic conductivity of at least about $10^{-7}$ S/cm and less than or equal to about $10^{-2}$ S/cm, an average ionic conductivity of at least about $10^{-6}$ S/cm and less than or equal to about $10^{-2}$ S/cm, an average ionic conductivity of at least about $10^{-5}$ S/cm and less than or equal to about $10^{-3}$ S/cm). Conductivity (e.g., dry conductivity) may be measured at room temperature (e.g., 25° C.), for example, using a conductivity bridge (i.e., an impedance measuring circuit) operating at 1 kHz in the absence of an electrolyte and/or solvent (i.e., for a dry protective layer and/or deposited layer).

In some aspects, the percent difference in ionic conductivity between the particles (e.g., prior to deposition or fusing) and the resulting layer (e.g., comprising the particles), may be less than about 1000%, less than about 700%, less than about 500%, less than about 200%, less than about 100%, less than about 50%, less than about 40%, less than about 30%, less than about 20%, less than about 10%, less than about 5%, less than about 3%, less than about 1%, or less than about 0.5%. In some cases, the percent difference in ionic conductivity between the particles (e.g., prior to deposition or fusing) and the resulting layer (e.g., comprising the particles), may be greater than or equal to about 0.1%, greater than or equal to about 0.5%, greater than or equal to about 1%, greater than or equal to about 3%, greater than or equal to about 5%, greater than or equal to about 10%, greater than or equal to about 20%, greater than or equal to about 50%, greater than or equal to about 100%, greater than or equal to about 200%, greater than or equal to about 500%, greater than or equal to about 700%, or greater than or equal to about 1000%. Combinations of the above-referenced ranges are also possible (e.g., between about 0.1% and about 10%). In some aspects, there is substantially no difference in ionic conductivity between the particles and the resulting layer. The percent different may be calculated by subtracting the lower value of ionic conductivity from the higher value of ionic conductivity, and dividing by the higher value of ionic conductivity.

In some aspects, at least a portion (e.g., at least a portion of the second layer not in contact with the first layer) of the protective layer and/or the resulting deposited layer (e.g., comprising a polymer and a plurality of particles), as described herein, may have a mean peak to valley roughness ($R_z$) of less than or equal to about 20 µm, less than or equal to about 15 µm, less than or equal to about 10 µm, less than or equal to about 5 µm, less than or equal to about 2 µm, less than or equal to about 1.5 µm, less than or equal to about 1 µm, less than or equal to about 0.9 µm, less than or equal to about 0.8 µm, less than or equal to about 0.7 µm, less than or equal to about 0.6 µm, less than or equal to about 0.5 µm, or any other appropriate roughness. In some aspects, at least a portion of the protective layer and/or the resulting deposited layer has an $R_z$ of greater than or equal to about 50 nm, greater than or equal to about 0.1 µm, greater than or equal to about 0.2 µm, greater than or equal to about 0.4 µm, greater than or equal to about 0.6 µm, greater than or equal to about 0.8 µm, greater than or equal to about 1 µm, greater than or equal to about 2 µm, greater than or equal to about 5 µm, greater than or equal to about 10 µm, greater than or equal to about 15 µm, or any other appropriate roughness. Combinations of the above-noted ranges are possible (e.g., an $R_z$ of greater than or equal to about 0.1 µm and less than or equal to about 20 µm). Other ranges are also possible.

The mean peak to valley roughness (Rz) may be calculated, for example, by imaging the surface with a non-contact 3D optical microscope (e.g., an optical profiler). Briefly, an image may be acquired at a magnification between about 5× and about 110× (e.g., an area of between about 50 microns×50 microns and about 1.2 mm×1.2 mm) depending on the overall surface roughness. Those skilled in the art would be capable of selecting an appropriate magnification for imaging the sample. The mean peak to valley roughness can be determined by taking an average of the height difference between the highest peaks and the lowest valleys for a given sample size (e.g., averaging the height difference between the five highest peaks and the five lowest valleys across the imaged area of the sample) at several different locations on the sample (e.g., images acquired at five different areas on the sample).

In some aspects, the first layer (e.g., a substrate such as an electroactive layer) on which the second layer (protective layer and/or the resulting deposited layer) is deposited, may have a mean peak to valley roughness in one or more of the above-referenced ranges for the protective layer and/or the deposited layer. In some cases, the roughness may be caused at least in part by particles being embedded in the first layer.

As described herein, it may be desirable to determine if a protective layer and/or the resulting deposited layer (e.g., comprising a plurality of fused particles) has advantageous properties as compared to other materials used as a protective layer (e.g., a protective layer formed of a polymeric material alone, a protective layer formed of an ion-conductive material alone, or combinations thereof) for particular electrochemical systems. Therefore, simple screening tests can be employed to help select between candidate materials. One simple screening test includes positioning a protective layer and/or resulting deposited layer (e.g., comprising a plurality of fused particles) in an electrochemical cell, e.g., as a protective layer or other component in a cell. The electrochemical cell may then undergo multiple discharge/charge cycles, and the electrochemical cell may be observed for whether inhibitory or other destructive behavior occurs compared to that in a control system. If inhibitory or other destructive behavior is observed during cycling of the cell, as compared to the control system, it may be indicative of a degradation mechanisms of the protective layer and/or resulting deposited layer, within the assembled electrochemical cell. Using the same electrochemical cell it is also possible to evaluate the electrical conductivity and ion conductivity of the protective layer and/or resulting deposited layer using methods known to one of ordinary skill in the art. The same electrochemical cell can also be cycled to determine cycle life in the presence or absence of the protective layer and/or the resulting deposited layer. The measured values may be compared to select between candidate materials and may be used for comparison with baseline material(s) in the control.

In some aspects, it may be desirable to test the protective layer and/or the resulting deposited layer for swelling in the presence of a particular electrolyte or solvent to be used in an electrochemical cell (including any salts or additives present). A simple screening test may involve, for example, pieces of the protective layer and/or the resulting deposited layer that are weighed and then placed in a solvent or an electrolyte to be used in an electrochemical cell for any suitable amount of time (e.g., 24 hours). The percent difference in weight (or volume) of the protective layer before and after the addition of a solvent or an electrolyte may determine the amount of swelling of the protective layer in the presence of the electrolyte or the solvent.

Another simple screen test involves determining the stability (i.e., integrity) of a second layer (protective layer and/or the resulting deposited layer) to polysulfides (e.g., for use in a lithium-sulfur electrochemical cells) and/or an electrolyte (e.g., for use in lithium-ion electrochemical cells). Briefly, the protective layer or the deposited layer may be exposed to a polysulfide solution/mixture or liquid electrolyte for any suitable amount of time (e.g., 72 hours) and the percent weight loss of the protective layer after exposure to the polysulfide solution or liquid electrolyte may be determined by calculating the difference in weight of the protective layer or the deposited layer before and after the exposure. For example, in some aspects, the percent weight loss of the protective layer and/or deposited layer after exposure to the polysulfide solution or liquid electrolyte may be less than or equal to about 15 wt %, less than or equal to about 10 wt %, less than or equal to about 5 wt %, less than or equal to about 2 wt %, less than or equal to about 1 wt %, or less than or equal to about 0.5 wt %. In certain aspects, the percent weight loss of the protective layer and/or deposited layer after exposure to the polysulfide solution or liquid electrolyte may be greater than about 0.1 wt %, greater than about 0.5 wt %, greater than about 1 wt %, greater than about 2 wt %, greater than about 5 wt %, or greater than about 10 wt %. Combinations of the above-referenced ranges are also possible (e.g., between about 0.1 wt % and about 5 wt %). In some cases, x-ray diffraction may be used to determine stability of a protective layer and/or the resulting deposited layer to polysulfides or liquid electrolytes.

The above described screening tests may also be adapted and used to determine the properties of individual components of the protective layer (e.g. polymeric material/polymer layer and/or a plurality of particles).

While many aspects described herein relate to lithium-sulfur and/or lithium-ion electrochemical cells, it is to be understood that any analogous alkali metal/sulfur electrochemical cells (including alkali metal anodes) can be used. As noted above and as described in more detail herein, in some aspects, the protective layer is incorporated into an electrochemical cell as a protective layer for an electrode. In some aspects, the protective layers disclosed herein may include in an electrochemical cell comprising at least one electrode structure. In some cases, the electrochemical cell may be fabricated by providing an electrode structure, one or more the protective layers, and an electrolyte layer. The electrode structures may include an electroactive layer (e.g., an anode or a cathode) and one or more protective layers. The protective layers may be highly conductive to electroactive material ions and may protect the underlying electroactive material surface from reaction with components in the electrolyte, as described above. In some embodiments, however, the protective layers may be non-conductive to electroactive material ions while protecting the underlying electroactive material surface from reaction with components in the electrolyte, as described herein. In some aspects, the protective layer may be adjacent the anode. In some aspects, the protective layer may be adjacent the cathode. In certain aspects, the protective layer may be adjacent and/or deposited on a separator. Other configurations are also possible.

An electrochemical cell or an article for use in an electrochemical cell may include an electroactive material layer. In some aspects, a first layer described herein (e.g., a layer on which a protective layer and/or resulting deposited layer is formed) comprises an electroactive material (e.g., the first layer is an electroactive layer). In some cases, the first layer may be an anode (e.g., an anode of an electrochemical cell).

Suitable electroactive materials for use as anode active materials in the electrochemical cells described herein include, but are not limited to, lithium metal such as lithium foil and lithium deposited onto a conductive substrate, and lithium alloys (e.g., lithium-aluminum alloys and lithium-tin alloys). Lithium can be contained as one film or as several films, optionally separated by a protective material such as a ceramic material or an ion conductive material described herein. Suitable ceramic materials include silica, alumina, or lithium containing glassy materials such as lithium phosphates, lithium aluminates, lithium silicates, lithium phosphorous oxynitrides, lithium tantalum oxide, lithium aluminosulfides, lithium titanium oxides, lithium silcosulfides, lithium germanosulfides, lithium aluminosulfides, lithium borosulfides, and lithium phosphosulfides, and combinations of two or more of the preceding. Suitable lithium alloys for use in the aspects described herein can include alloys of lithium and aluminum, magnesium, silicium (silicon), indium, and/or tin. While these materials may be preferred in some aspects, other cell chemistries are also contemplated. In some aspects, the anode may comprise one or more binder materials (e.g., polymers, etc.).

One or more electroactive layers (e.g., comprising an electroactive material), as described herein, may have a mean peak to valley roughness ($R_z$) of greater than or equal to about 50 nm, greater than or equal to about 0.1 µm, greater than or equal to about 0.2 µm, greater than or equal to about 0.4 µm, greater than or equal to about 0.6 µm, greater than or equal to about 0.8 µm, greater than or equal to about 1 µm, greater than or equal to about 2 µm, greater than or equal to about 5 µm, greater than or equal to about 10 µm, greater than or equal to about 15 µm, or any other appropriate roughness. In some aspects, the one or more electroactive layers (e.g., comprising an electroactive material) has an $R_z$ of less than or equal to about 20 µm, less than or equal to about 15 µm, less than or equal to about 10 µm, less than or equal to about 2 µm, less than or equal to about 1.5 µm, less than or equal to about 1 µm, less than or equal to about 0.9 µm, less than or equal to about 0.8 µm, less than or equal to about 0.7 µm, less than or equal to about 0.6 µm, less than or equal to about 0.5 µm, or any other appropriate roughness. Combinations of the above-noted ranges are possible (e.g., an $R_z$ of greater than or equal to about 0.1 µm and less than or equal to about 20 µm, an $R_z$ of greater than or equal to about 0.1 µm and less than or equal to about 5 µm). Other ranges are also possible. In some aspects, the mean peak to valley roughness of one or more electroactive layers is determined prior to charge/discharge of the electrochemical cell. The mean peak to valley roughness ($R_z$) of the one or more electroactive layers may be determined, for example, by imaging the surface with a non-contact 3D optical microscope (e.g., an optical profiler), as described above.

In some such aspects, a first layer described herein (e.g., a layer on which a second layer e.g., a protective layer and/or resulting deposited layer, is formed) may be a cathode (e.g., a cathode of an electrochemical cell). Suitable electroactive materials for use as cathode active materials in the cathode of the electrochemical cells described herein may include, but are not limited to, electroactive transition metal chalcogenides, electroactive conductive polymers, sulfur, carbon, and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one aspect, the transition metal chalcogenide is selected from the group consisting of the electroactive oxides of nickel, manganese, cobalt, and vanadium, and the electroactive sulfides of iron. In certain aspects, the cathode may include as an electroactive species elemental sulfur, sulfides, and/or polysulfides. In other aspects, an intercalation electrode (e.g., a lithium-intercalation cathode) may be used. Non-limiting examples of suitable materials that may intercalate ions of an electroactive material (e.g., alkaline metal ions) include oxides, titanium sulfide, and iron sulfide. Additional examples include $LixCoO_2$, $Li_xNiO_2$, $LixMnO_2$, $LixMn_2O_4$, $Li_xFePO_4$, $Li_xCoPO_4$, $Li_xMnPO_4$, and $Li_xNiPO_4$, where (0<x≤1), and $LiNi_xMn_yCo_zO_2$ where (x+y+z=1).

In one aspect, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another aspect, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some aspects, electroactive materials for use as cathode active materials in electrochemical cells described herein include electroactive sulfur-containing materials (e.g., lithium-sulfur electrochemical cells). "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one aspect, the electroactive sulfur-containing material comprises elemental sulfur. In another aspect, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In certain aspects, the sulfur-containing material (e.g., in an oxidized form) comprises a polysulfide moiety, Sm, selected from the group consisting of covalent Sm moieties, ionic Sm moieties, and ionic $Sm_2$— moieties, wherein m is an integer equal to or greater than 3. In some aspects, m of the polysulfide moiety Sm of the sulfur-containing polymer is an integer equal to or greater than 6 or an integer equal to or greater than 8. In some cases, the sulfur-containing material may be a sulfur-containing polymer. In some aspects, the sulfur-containing polymer has a polymer backbone chain and the polysulfide moiety Sm is covalently bonded by one or both of its terminal sulfur atoms as a side group to the polymer backbone chain. In certain aspects, the sulfur-containing polymer has a polymer backbone chain and the polysulfide moiety Sm is incorporated into the polymer backbone chain by covalent bonding of the terminal sulfur atoms of the polysulfide moiety.

In some aspects, the electroactive sulfur-containing material comprises more than 50% by weight of sulfur. In certain aspects, the electroactive sulfur-containing material comprises more than 75% by weight of sulfur (e.g., more than 90% by weight of sulfur).

As will be known by those skilled in the art, the nature of the electroactive sulfur-containing materials described herein may vary widely. In some aspects, the electroactive sulfur-containing material comprises elemental sulfur. In certain aspects, the electroactive sulfur-containing material comprises a mixture of elemental sulfur and a sulfur-containing polymer.

In certain aspects, an electrochemical cell as described herein, comprises one or more cathodes comprising sulfur as a cathode active species. In some such aspects, the cathode includes elemental sulfur as a cathode active species.

In some aspects, a first layer described herein (e.g., a layer on which a second layer e.g., a protective layer and/or resulting deposited layer, is formed) is a separator. For instance, in some aspects, the plurality of particles are deposited on a separator (e.g., via aerosol deposition). Such separators generally comprise a polymeric material (e.g., polymeric material that does or does not swell upon exposure to electrolyte). In some aspects, the separator is located between the protective layer and an electrode (e.g., an anode, a cathode). In some cases, the separator may be coated (e.g., pre-coated) with a material, such as a ceramic material.

The separator can be configured to inhibit (e.g., prevent) physical contact between a first electrode and a second electrode, which could result in short circuiting of the electrochemical cell. The separator can be configured to be substantially electronically non-conductive, which can inhibit the degree to which the separator causes short circuiting of the electrochemical cell. In certain aspects, all or portions of the separator can be formed of a material with a bulk electronic resistivity of at least about $10^4$, at least about $10^5$, at least about $10^{10}$, at least about $10^{15}$, or at least about $10^{20}$ Ohm-meters. Bulk electronic resistivity may be measured at room temperature (e.g., 25° C.).

In some aspects, the separator can be ionically conductive, while in other aspects, the separator is substantially ionically non-conductive. In some aspects, the average ionic conductivity of the separator is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain aspects, the average ionic conductivity of the separator may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm).

In some aspects, the separator can be a solid. The separator may be porous to allow an electrolyte solvent to pass through it. In some cases, the separator does not substantially include a solvent (like in a gel), except for solvent that may pass through or reside in the pores of the separator. In other aspects, a separator may be in the form of a gel.

A separator as described herein can be made of a variety of materials. The separator may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly (pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some aspects, the polymer may be selected from poly(n-pentene-2), polypropylene, polytetrafluoroethylene, polyamides (e.g., polyamide (Nylon), poly(ϵ-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The mechanical and electronic properties (e.g., conductivity, resistivity) of these polymers are known. Accordingly, those of ordinary skill in the art can choose suitable materials based on their mechanical and/or electronic properties (e.g., ionic and/or electronic conductivity/resistivity), and/or can modify such polymers to be ionically conducting (e.g., conductive towards single ions) based on knowledge in the art, in combination with the description herein. For example, the polymer materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity, if desired.

Those of ordinary skill in the art, given the present disclosure, would be capable of selecting appropriate materials for use as the separator. Relevant factors that might be considered when making such selections include the ionic conductivity of the separator material; the ability to deposit or otherwise form the separator material on or with other materials in the electrochemical cell; the flexibility of the separator material; the porosity of the separator material (e.g., overall porosity, average pore size, pore size distribution, and/or tortuosity); the compatibility of the separator material with the fabrication process used to form the electrochemical cell; the compatibility of the separator material with the electrolyte of the electrochemical cell; and/or the ability to adhere the separator material to the ion conductor material. In certain aspects, the separator material can be selected based on its ability to survive the aerosol deposition processes without mechanically failing. For example, in aspects in which relatively high velocities are used to deposited the plurality of particles (e.g., inorganic particles), the separator material can be selected or configured to withstand such deposition.

The first layer (e.g., the separator) may be porous. In some aspects, the pore size of the first layer (e.g., separator pore size) may be, for example, less than 5 microns. In certain aspects, the separator pore size may be between 50 nm and 5 microns, between 50 nm and 500 nm, between 100 nm and 300 nm, between 300 nm and 1 micron, between 500 nm and 5 microns. In some aspects, the pore size may be less than or equal to 5 microns, less than or equal to 1 micron, less than or equal to 500 nm, less than or equal to 300 nm, less than or equal to 100 nm, or less than or equal to 50 nm. In some aspects, the pore size may be greater than 50 nm, greater than 100 nm, greater than 300 nm, greater than 500 nm, or greater than 1 micron. Other values are also possible. Combinations of the above-noted ranges are also possible (e.g., a pore size of less than 300 nm and greater than 100 nm). In certain aspects, the first layer (e.g., separator) may be substantially non-porous.

As described herein, in certain aspects, the electrochemical cell comprises an electrolyte. The electrolytes used in electrochemical or battery cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some aspects, the electrolyte may comprise a non-solid electrolyte.

In some aspects, an electrolyte is in the form of a layer having a particular thickness. An electrolyte layer may have a thickness of, for example, at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some aspects, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible.

In some aspects, the electrolyte includes a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity) as described herein. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some cases, mixtures of the solvents described herein may also be used. For example, in some aspects, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may range, in some cases, from about 5 wt %:95 wt % to 95 wt %:5 wt %.

Non-limiting examples of suitable gel polymer electrolytes include polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing.

Non-limiting examples of suitable solid polymer electrolytes include polyethers, polyethylene oxides, polypropylene oxides, polyimides, polyphosphazenes, polyacrylonitriles, polysiloxanes, derivatives of the foregoing, copolymers of the foregoing, cross-linked and network structures of the foregoing, and blends of the foregoing.

In some aspects, the electrolyte comprises at least one electrolyte additive such as a lithium salt. For example, in some cases, the at least one lithium salt is selected from the group consisting of LiNO$_3$, LiPF$_6$, LiBF$_4$, LiClO$_4$, LiAsF$_6$, Li$_2$SiF$_6$, LiSbF$_6$, LiAlCl$_4$, lithium bis-oxalatoborate, LiCF$_3$SO$_3$, LiN(SO$_2$F)$_2$, LiC(C$_n$F$_{2n+1}$SO$_2$)$_3$, wherein n is an integer in the range of from 1 to 20, and $(C_nF_{2n+1}SO_2)_mXLi$ with n being an integer in the range of from 1 to 20, m being 1 when X is selected from oxygen or sulfur, m being 2 when X is selected from nitrogen or phosphorus, and m being 3 when X is selected from carbon or silicon.

In some embodiments, the electrolyte comprises at least one electrolyte additive such as nitrate or other N—O compound. Examples of NO compounds include, but are not limited to, families such as inorganic nitrates, organic nitrates, inorganic nitrites, organic nitrites, organic nitro compounds, compounds with negatively, neutral and positively charged NOx groups, and other organic N—O compounds. Examples of inorganic nitrates that may be used include, but are not limited to, lithium nitrate, potassium nitrate, cesium nitrate, barium nitrate, and ammonium nitrate. Examples of organic nitrates that may be used include, but are not limited to, dialkyl imidazolium nitrates, guanidine nitrate, and pyridine nitrate. Examples of inorganic nitrites that may be used include, but are not limited to, lithium nitrite, potassium nitrite, cesium nitrite, and ammonium nitrite. Examples of organic nitrites that may be used include, but are not limited to, ethyl nitrite, propyl nitrite, butyl nitrite, pentyl nitrite, and octyl nitrite. Examples organic nitro compounds that may be used include, but are not limited to, nitromethane, nitropropane, nitrobutanes, nitrobenzene, dinitrobenzene, nitrotoluene, dinitrotoluene, nitropyridine, and dinitropyridine. Examples of other organic N—O compounds that may be used include, but are not limited to, pyridine N-oxide, alkylpyridine N-oxides, and tetramethyl piperidine N-oxyl (TEMPO). These and other additives are described in more detail in U.S. Pat. No. 7,553,590, entitled "Electrolytes for lithium sulfur cells," which is incorporated herein by reference in its entirety.

In some embodiments, the electrolyte additive (e.g., lithium salt, nitrate or other N—O compound) is present in an electrolyte in an amount of at least about 0.01 wt %, at least about 0.05 wt %, at least about 0.1 wt %, at least about 0.5 wt %, at least about 1 wt %, at least about 2 wt %, at least about 5 wt %, at least about 10 wt %, or at least about 15 wt % versus the total electrolyte weight. In certain embodiments, the electrolyte additive (e.g., lithium salt, nitrate or other N—O compound) is present in an electrolyte in an amount of less than or equal to about 20 wt %, less than or equal to about 15 wt %, less than or equal to about 10 wt %, less than or equal to about 5 wt %, less than or equal to about 4 wt %, less than or equal to about 2 wt %, less than or equal to about 1 wt %, less than or equal to about 0.5 wt %, less than or equal to about 0.1 wt %, or less than or equal to about 0.05 wt % versus the total electrolyte weight. Combinations of the above-referenced ranges are also possible (e.g., at least about 0.01 wt % and less than or equal to about 20 wt %). Other ranges are also possible.

An electrochemical cell comprising one or more additives described herein may offer one or more advantages over electrochemical cells that do not include such an additive, including, but not limited to, increasing cycle lifetimes, providing improved lithium morphologies, increasing the compaction of lithium, and/or reducing the depletion of lithium during charge/discharge of an electrochemical cell. In some cases, the additive may form a passivation layer on the electroactive material (e.g., an anode, a first layer).

Advantageously, an electrochemical cell comprising a porous protective layer (e.g., second layer) described herein may permit one or more electrolyte additives in the electrolyte to contact (e.g., directly contact) the surface of the electroactive layer (e.g., first layer). These one or more additives may benefit the electroactive layer and/or the overall electrochemical cell, as described herein. In some cases, this contact between the additive and the electroactive layer can facilitate the formation of a passivation layer on the electroactive layer (e.g., first layer). By contrast, certain traditional non-porous protective layers that prevent or reduce exposure of the electroactive layer to adverse species in the electrolyte (e.g., species that would adversely react with the surface of the electroactive layer) may similarly prevent or reduce exposure of the electroactive layer to electrolyte additives which may be beneficial for the electroactive layer and/or overall electrochemical cell. Accordingly, the porous protective layers described herein may simultaneously allow protection of the electroactive layer (e.g., by reducing the amount of exposure of the electroactive layer to adverse species), while allowing good ionic conductivity across the protective layer and exposure of the electroactive layer to beneficial species in the electrolyte, thereby enhancing the overall performance of the electrochemical cell compared to electrochemical cells that do not include such a porous protective layer.

In some aspects, the first layer described herein (e.g., a layer on which a second layer e.g., a protective layer and/or resulting deposited layer is formed) comprises a material that can dissolve in an electrolyte to be used with the electrochemical cell, or in any other suitable solvent (e.g., a non-electrolyte solvent). Accordingly, at least a portion, or all, of the first layer may be removed from the protective layer and/or resulting deposited layer. Removal of at least a portion, or all, of the first layer may take place prior to the protective layer and/or resulting deposited layer being placed in an electrochemical cell, or after the protective layer being placed in an electrochemical cell. In some cases, removal can take place during cycling of the electrochemical cell. Non-limiting examples of materials that can dissolve in an electrolyte or any other suitable solvent include, for example, polysulphone, polyethylene oxide, kynar, and polystyrene.

For example, in some aspects, at least about 10 vol %, at least about 20 vol %, at least about 30 vol %, at least about 50 vol %, at least about 70 vol %, or at least about 90 vol % of the first layer may be removed from the protective layer and/or resulting deposited layer. In certain aspects, less than or equal to about 100 vol %, less than or equal to about 90 vol %, less than or equal to about 70 vol %, less than or equal to about 50 vol %, less than or equal to about 30 vol %, or less than or equal to about 20 vol % of the first layer may be removed from the protective layer and/or resulting deposited layer. Combinations of the above-referenced ranges are also possible (e.g., between about 10 vol % and about 100 vol %). In some cases, substantially all (e.g., 100%) of the first layer may be removed from the protective layer and/or resulting deposited layer.

In some aspects, an electrode structure described herein comprises at least one current collector. Materials for the current collector may be selected, in some cases, from metals (e.g., copper, nickel, aluminum, passivated metals, and other appropriate metals), metallized polymers, electrically conductive polymers, polymers comprising conductive particles dispersed therein, and other appropriate materials. In certain aspects, the current collector is deposited onto the electrode layer using physical vapor deposition, chemical vapor deposition, electrochemical deposition, sputtering, doctor blading, flash evaporation, or any other appropriate deposition technique for the selected material. In some cases, the current collector may be formed separately and bonded to the electrode structure. It should be appreciated, however, that in some aspects a current collector separate from the electro active layer may not be needed.

The following examples are intended to illustrate certain aspects of the present invention, but do not exemplify the full scope of the invention.

EXAMPLES

Example 1

This example illustrates the formation of a protective layer by depositing and fusing a plurality of particles by aerosol deposition on a substrate.

An aerosol deposition method was used to deposit porous layers of various materials on electrodes. For example, particles having an average largest cross-sectional area of 10 μm or smaller were deposited onto a lithium surface (e.g., a first surface) via an aerosol deposition method in which the particles were accelerated at high speed (e.g., at least about 200 m/s), and upon impact with the lithium surface, began to build a layer through impact and fusion with one another. The bombardment by particles broke up any passivation layer that was formed on the lithium surface, which in turn resulted in a more intimate contact between the deposited layer and the lithium. Without wishing to be bound by theory, this resulting deposited protective layer improves cell performance by increasing cycle life and lowers the initial resistance of the constructed cell.

Figures 3A, 3B:
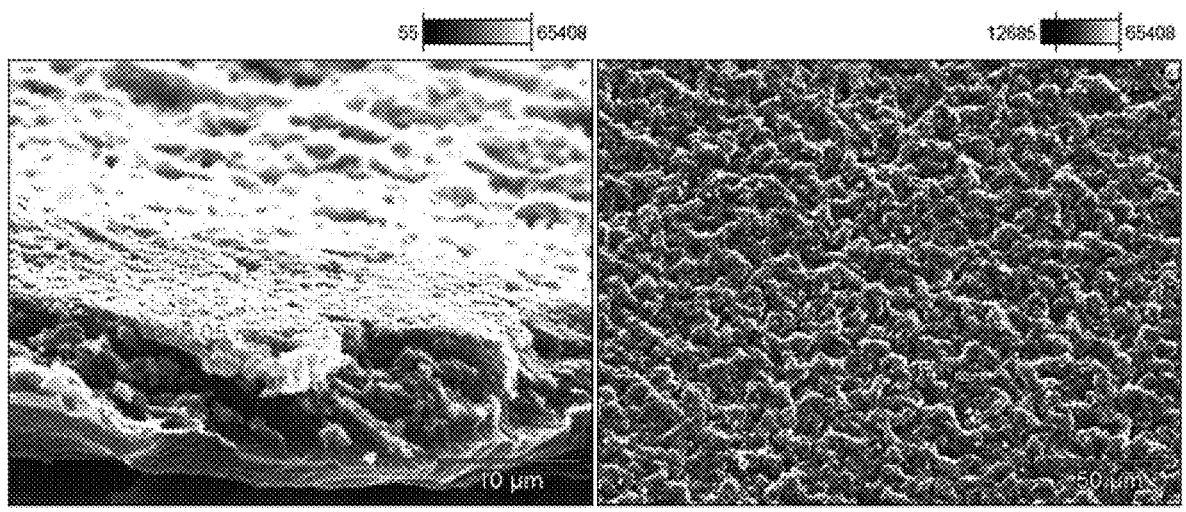
FIG. 3A shows a cross-sectional view SEM image of a protective layer/resulting deposited layer, according to certain aspects.
FIG. 3B shows a top-down SEM views of the protective layer/resulting deposited layer in FIG. 3A, according to certain aspects.

Ionically Conductive Materials:

Several examples of porous protective layers/deposited layers comprising ionically conductive materials deposited via aerosol deposition have been constructed and tested. The resulting protective layers were porous and at least a portion of the ionically conductive material was fused and/or embedded into the lithium surface. Electrochemical cells having such deposited protective layers showed lower initial impedances than control cells (electrochemical cells having substantially similar features but without particles deposited on the electrode) and increased cycle life performance over control cells. In one example, $Li_{24}SiP_2S_{19}$ (also referred to as Li24), in the form of 3-5 micron particles, was used as the ionically conductive material and was deposited on a 15 micron thick lithium layer (first layer) such that at least a portion of the Li24 particles fused. FIG. 3A shows a submicron protective layer (second layer) including Li24 on a lithium surface. The resulting protective layer was approximately 0.65 microns thick. The effects of depositing the particles on the lithium surface can be seen in FIG. 3B. Although the roughness of the surface of the lithium layer has increased (as compared to the surface roughness of the surface of the lithium layer prior to deposition), no detrimental effects on cell cycle lifetime were noted with this change.

In another example, $Li_{22}SiP_2S_{18}$, in the form of particles having an average largest cross-sectional dimension of between 5-10 microns, was used as the ionically conductive material deposited onto a separator (e.g., a first layer) comprising polyethylene, which was coated (e.g., pre-coated) with alumina or boehmite. In yet another example, $Li_{22}SiP_2S_{18}$, in the form of 5-10 micron particles, was deposited via aerosol deposition onto a lithium layer (e.g., first layer) having a thickness of 25 microns.

Figure 4A:
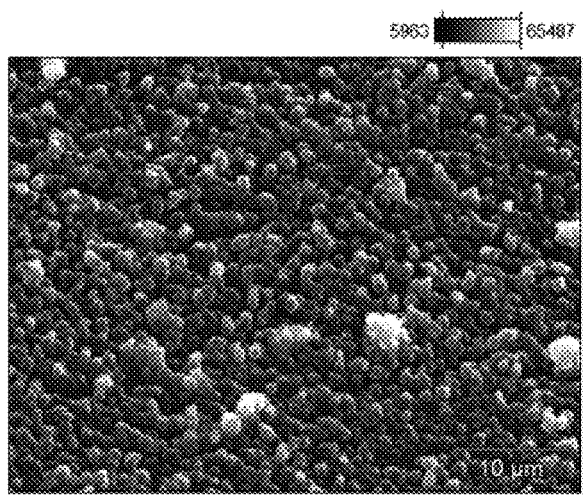
FIG. 4A shows a top-down SEM views of a protective layer/resulting deposited layer, according to certain aspects.
Figure 4B:
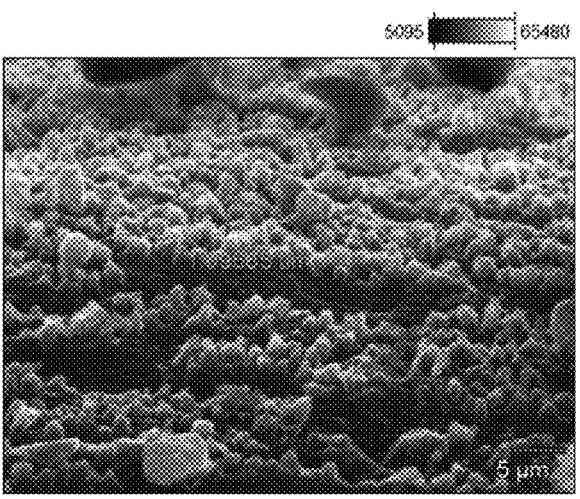
FIG. 4B shows a cross-sectional view SEM image of the protective layer/resulting deposited layer in FIG. 4A, according to certain aspects.

Mixture of Ionically Conductive Materials and Polymeric Particles:

Several examples of porous protective layers/deposited layers comprising a mixture of at least one ionically conductive material and polymer spheres deposited via aerosol deposition have been constructed and tested. In one example, a mixture of 70 vol % Li24 and 30 vol % polyethylene (PE) spheres (having an average largest cross-sectional dimension of 1 micron) was prepared and deposited via aerosol deposition on a 25 micron thick lithium layer (first layer), such that at least a portion of the Li24 particles fused. The resulting deposited layer (second layer) was porous, approximately 1 micron in average thickness, and is shown in FIGS. 4A-4B.

Figure 5A:
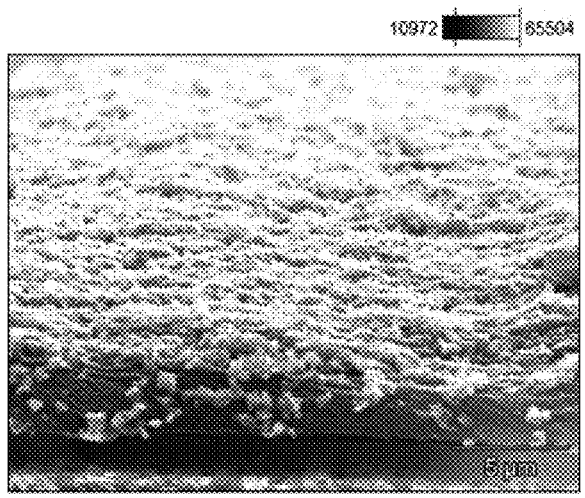
FIG. 5A shows a cross-sectional view SEM image of a protective layer/resulting deposited layer, according to certain aspects.
Figure 5B:
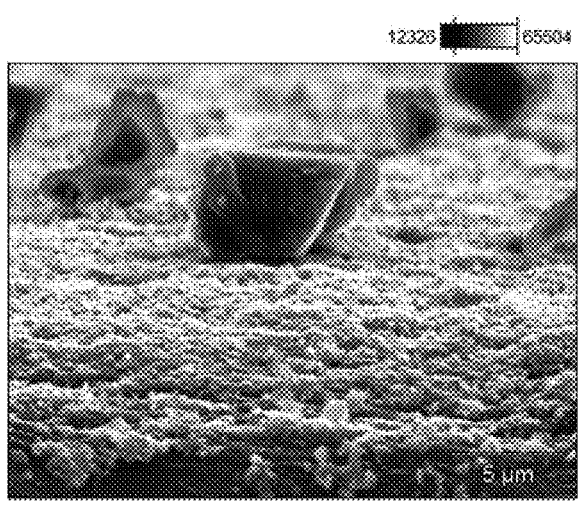
FIG. 5B shows another cross-sectional view SEM image of the protective layer/resulting deposited layer in FIG. 5A, according to certain aspects.
Figures 6A, 6B:
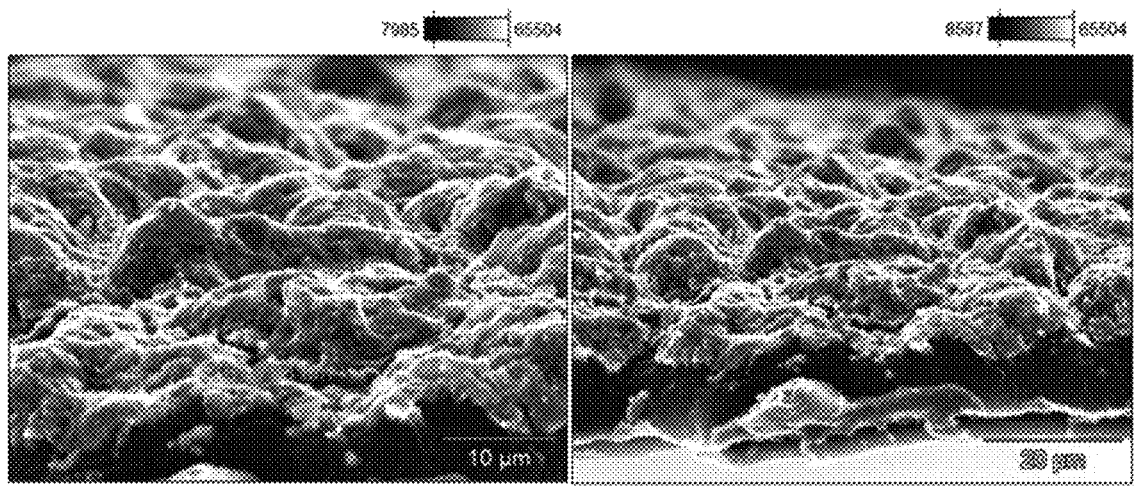
FIG. 6A shows a cross-sectional view SEM image of a protective layer/resulting deposited layer, according to certain aspects.
FIG. 6B shows another cross-sectional view SEM image of the protective layer/resulting deposited layer in FIG. 6A, according to certain aspects.

Non-Conductive Ceramics such as Alumina and Silica Alone:

Several examples of porous protective layers/deposited layers comprising non-conductive ceramics (and no ionically conductive material) deposited via aerosol deposition have been constructed and tested. In one example, $Al_2O_3$ particles (having an average largest cross-sectional dimension of between 0.5 microns and 5 microns) was deposited via aerosol deposition onto a 25 um thick lithium layer (first layer) such that at least a portion of the $Al_2O_3$ particles fused, forming a porous protective layer (second layer). Examples of these porous protective layers are shown in FIGS. 5A-6B. Note: FIGS. 5A-5B show a 0.4 micron thick protective layer including $Al_2O_3$ on the lithium layer. FIG. 5B shows an unfused $Al_2O_3$ particle placed on top of the protective layer (after the deposition process) for comparison to the fused $Al_2O_3$ in the deposited layer. FIGS. 6A-6B show a porous protective layer comprising $Al_2O_3$ approximately 0.75 microns thick deposited on the lithium layer. The wavy/rough surface topology resulting from the deposition can be seen in FIGS. 6A-6B.

Mixture of Ionically Conductive Materials, Non-Ionically Conductive Materials, and/or Polymeric Particles:

Several examples of porous protective layers/deposited layers comprising a mixture of ionically of at least one ionically conductive material, at least one non-ionically conductive materials, and/or polymeric particles deposited via aerosol deposition have been constructed and tested. In one example, a mixture comprising 75 vol % Li24 and 25 vol % $Al_2O_3$ was prepared and deposited via aerosol deposition on a 25 micron thick lithium layer (first layer) to form a porous deposited layer (second layer) on the lithium layer, (not shown).

Figure 7A:
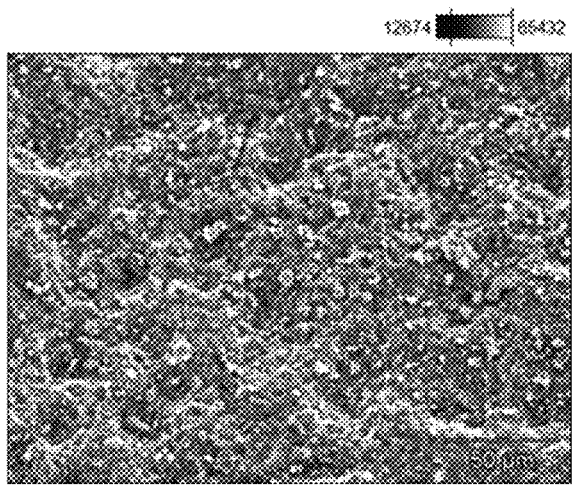
FIG. 7A shows a top-down SEM views of a protective layer/resulting deposited layer, according to certain aspects.
Figure 7B:
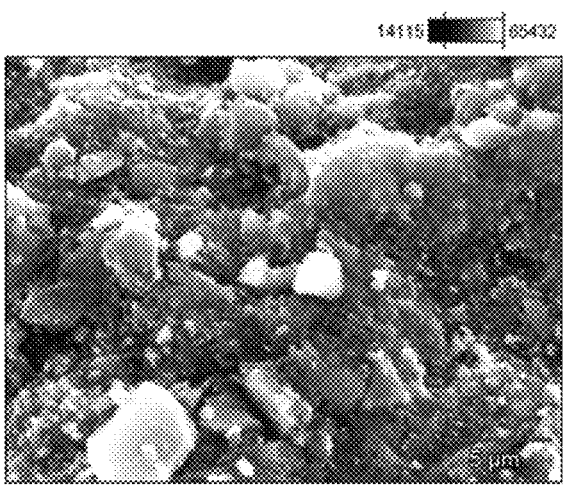
FIG. 7B shows another top-down SEM views of the protective layer/resulting deposited layer in FIG. 7A, according to certain aspects.

Another mixture comprising 70 vol % Li24, 20 vol % $Al_2O_3$, and 10 vol % polyethylene (PE) spheres was prepared and deposited via aerosol deposition on the lithium layer (first layer) to form a porous protective layer (second layer), approximately 1 micron thick, on the lithium layer, and is shown in FIGS. 7A-7B. The wavy/rough nature of the surface of the protective layer can be seen in FIG. 7A, and the partial fusion of the Li24 and the $Al_2O_3$ is readily observable in FIG. 7B.

Figure 14A:
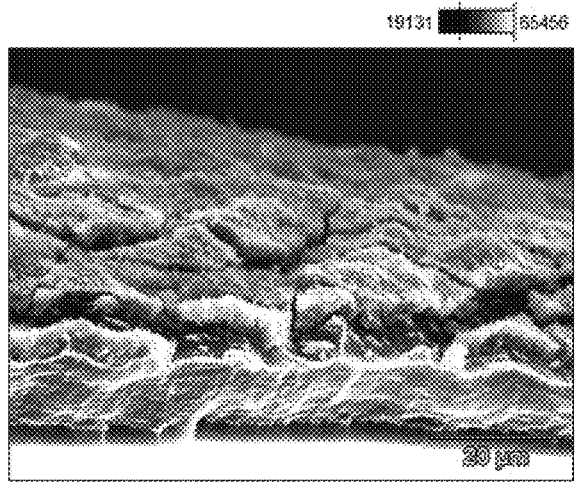
FIG. 14A shows a cross-sectional view SEM image of a protective layer/resulting deposited layer, according to certain aspects.
Figure 14B:
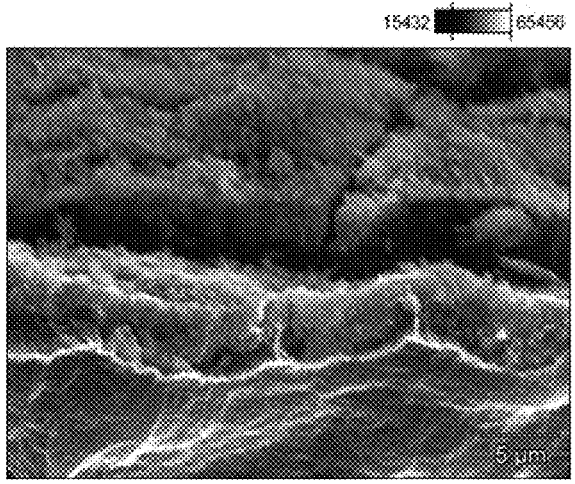
FIG. 14B shows a cross-sectional view SEM image of a protective layer/resulting deposited layer, according to certain aspects.
Figure 14C:
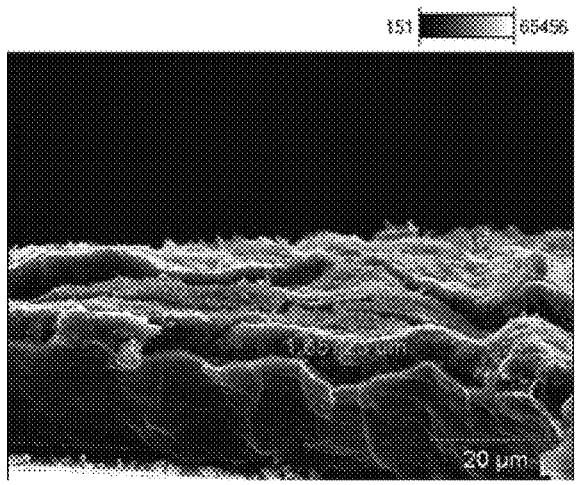
FIG. 14C shows a cross-sectional view SEM image of a protective layer/resulting deposited layer, according to certain aspects.
Figure 14D:
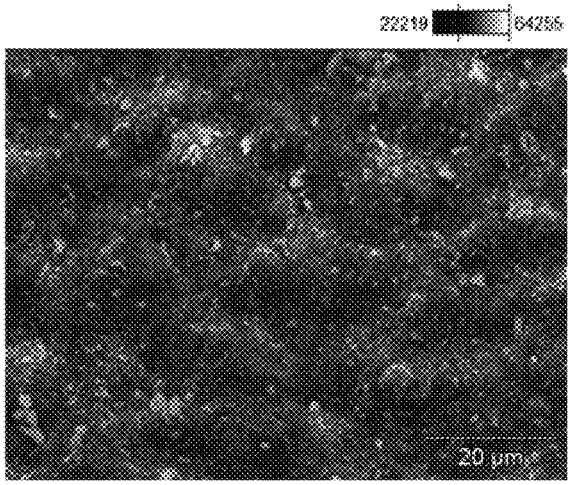
FIG. 14D shows a top-down view SEM image of a protective layer/resulting deposited layer, according to certain aspects.

Another mixture comprising equal vol % of $Al_2O_3$, silica, and lithium bis(oxalate)borate was prepared and deposited via aerosol deposition on a lithium layer (e.g., a first layer) of 25 microns in thickness to form a porous protective layer (e.g., second layer) approximately 1.66 microns thick, on the lithium layer, and is shown in cross-sectional views in FIGS. 14A-14C and a top-down view in FIG. 14D.

Yet another mixture comprising equal vol % of $Al_2O_3$ and $Li_{22}SiP_2S_{18}$ was prepared and deposited via aerosol deposition on a lithium layer (e.g., a first layer) of 25 microns in thickness to form a porous protective layer (e.g., a second layer) between 0.3-1.2 microns thick on the lithium layer.

Cell Data:

The layers described above were incorporated into two types of electrochemical cells for testing, a first electrochemical cell (bicell) and a second electrochemical cell (cathode centered cell), with a liquid electrolyte.

To form the first electrochemical cell:
1. Cut cathode to 43.45 mm wide×45 mm (assuring 36.83 mm active width). Attach Ni tab along bare foil to almost full length (45 mm) using spot welder (approx. 10 spots or more).
2. Cut anode to 43.45 mm×50 mm. Attached Ni tab almost full length (50 mm) using spot welder (approx. 10 spots or more).
3. Lay down protected anode with deposited protective layer side up and place separator (polypropylene; 41.91 mm×52.5 mm) over all of the protected anode leaving about 1 mm of the tab exposed.
4. Placed single sided lithium iron phosphate (LFP) cathode, active side down, onto separator centering top and bottom in relationship to the anode.
5. Taped all together across the top then cut tabs to a shorter length so as to attach a tab on the spot welder.

To form the second electrochemical cell:
1. Cut LFP cathode to 43.45 mm wide×90 mm (assuring 36.83 mm active width), for single sided cathode and 45 mm long for double sided. Attached Ni tab just short of 45 mm along the bare foil using spot welder (approx. 10 spots or more).
2. Cut anode to 43.45 mm×100 mm. Attached Ni tab just short of 50 mm using spot welder (approx. 10 spots or more).
3. Lay down protected anode with deposited protective layer side up and placed separator (polypropylene; 43.45 mm×105 mm) over all of the protected anode leaving about 1 mm of the tab exposed.
4. Placed cathode onto separator centering top and bottom in relationship to the anode. Ensure to overlap bare foil of the cathode onto the untabbed edge of the Li about 1 mm.
5. Folded separator up to the bottom of the cathode and crease. Do the same with the anode.
6. Taped all together across the top then cut tabs to a shorter length so as to attach a tab on the spot welder.

Figure 8:
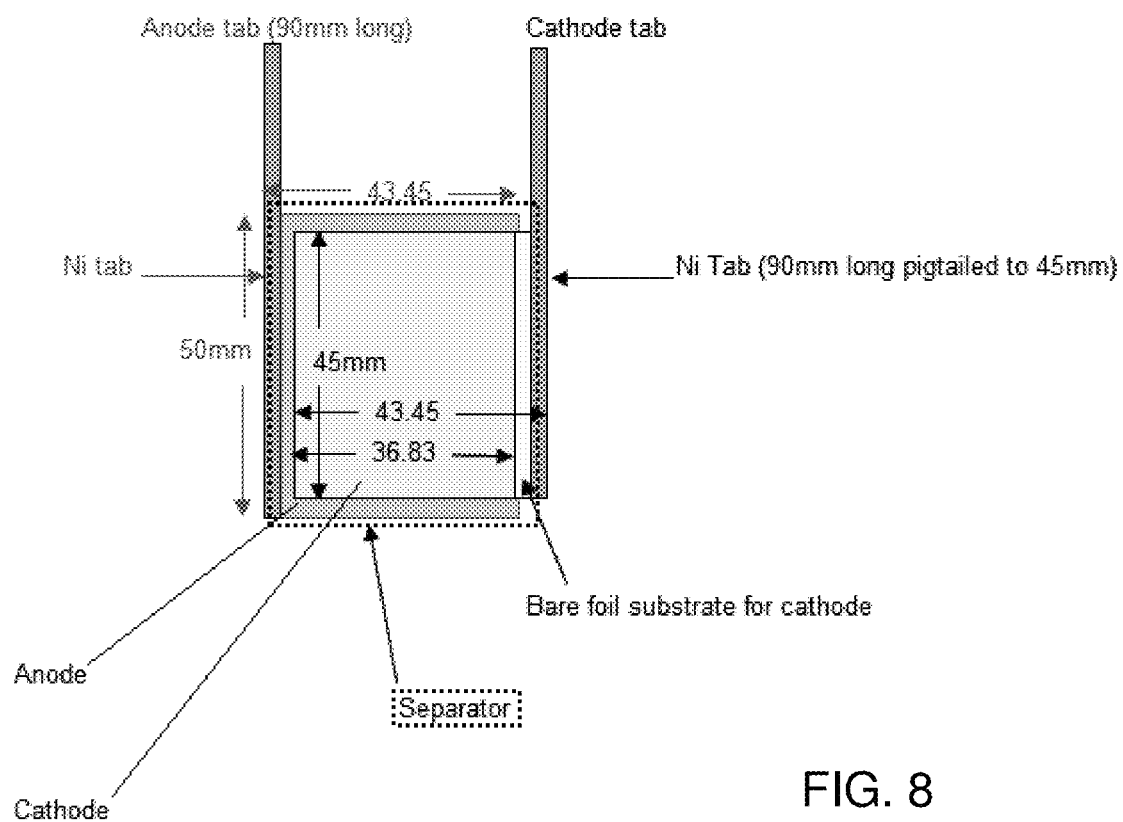
FIG. 8 shows a schematic illustration of an exemplary electrochemical cell including a protective layer/resulting deposited layer, according to certain aspects.

A diagram illustrating the arrangement of the first electrochemical cell is shown in FIG. 8.

Figure 9:
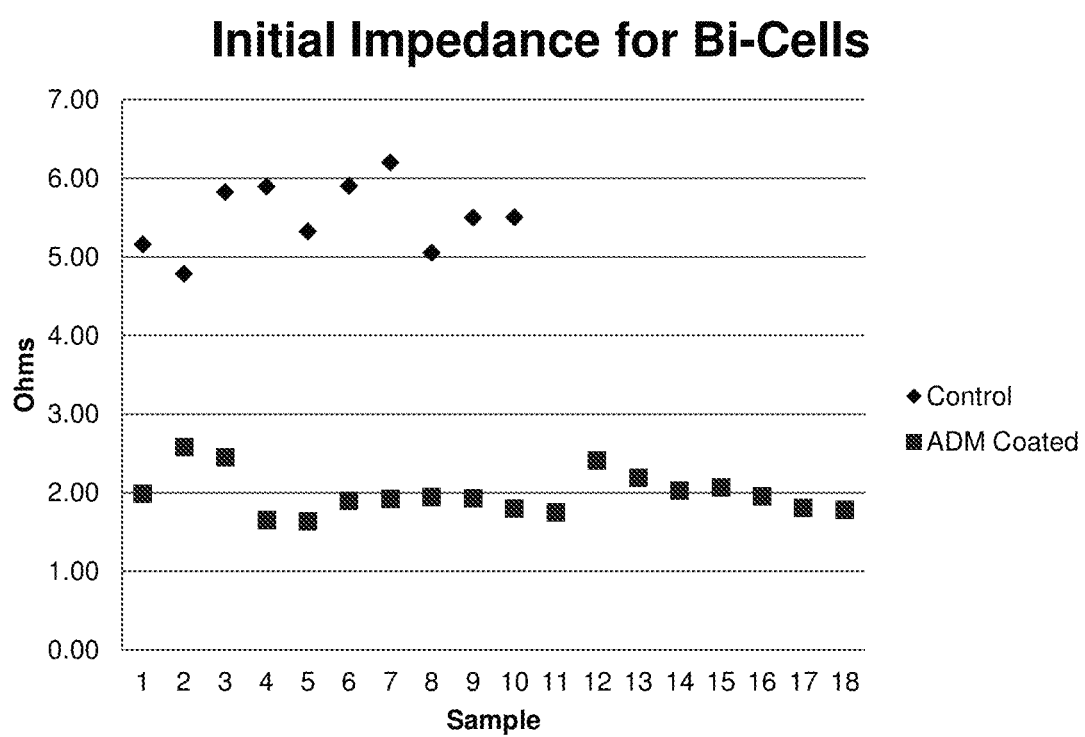
FIG. 9 is a plot of initial impedance (ohms) for bi-cells, according to certain aspects.

FIG. 9 shows the initial impedances for exemplary electrochemical cells including a lithium anode without a protective layer (control), and exemplary samples including a porous protective layer deposited and formed via aerosol deposition on the anode. The porous protective layer comprised Li24/$Al_2O_3$/PE (70/20/10% by volume). The control cells had an average initial impedance of 5.52+/−0.44 Ohms. The electrochemical cells including the porous protective layer had an average initial impedance of 1.99+/−0.268 Ohms. Initial impedance was measured at 1 kHz.

Figure 10:
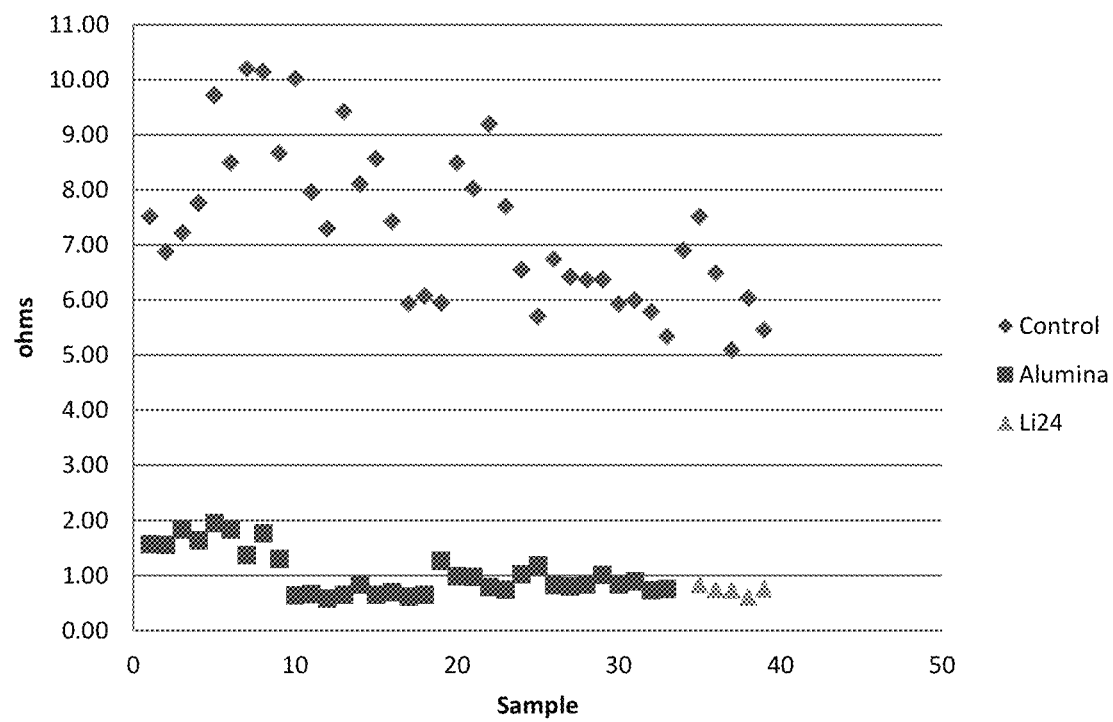
FIG. 10 is a plot of initial impedance (ohms) for cathode centered cells, according to certain aspects.

FIG. 10 shows the initial cell impedance for larger capacity cathode centered cells. Control cells had an average initial impedance of 7.52+/−1.433 Ohms. Electrochemical cells including the porous protective layer comprising Li24 (as described above) had an average initial impedance of 0.75+/−0.081 Ohms. Electrochemical cells including the porous protective layer comprising $Al_2O_3$ (as described above) had an average initial impedance of 1.04+/−0.42 Ohms.

In both cases the influence of the protective layer on the initial impedance of the cell was dramatic. For the bi-cells the electrochemical cells including a porous protective layer demonstrated a 2.5 times reduction in initial impedance over controls, while in cathode centered cells the electrochemical cells including a porous protective layer demonstrate a seven fold decrease for protective layers comprising $Al_2O_3$ and an order of magnitude decrease for protective layers comprising Li24, as compared to the control.

Figure 11:
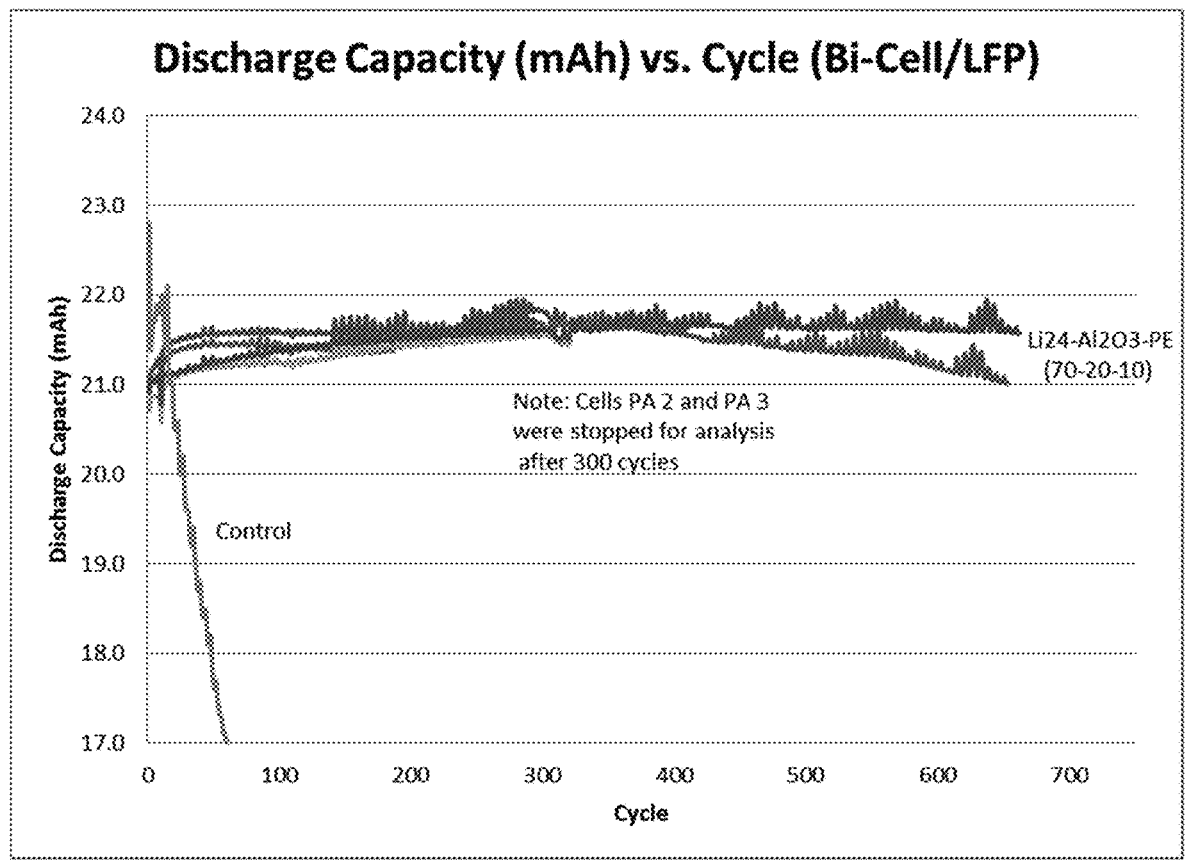
FIG. 11 is a plot of discharge capacity as a function of charge/discharge cycle for several exemplary bi-cells, according to certain aspects.
Figure 12:
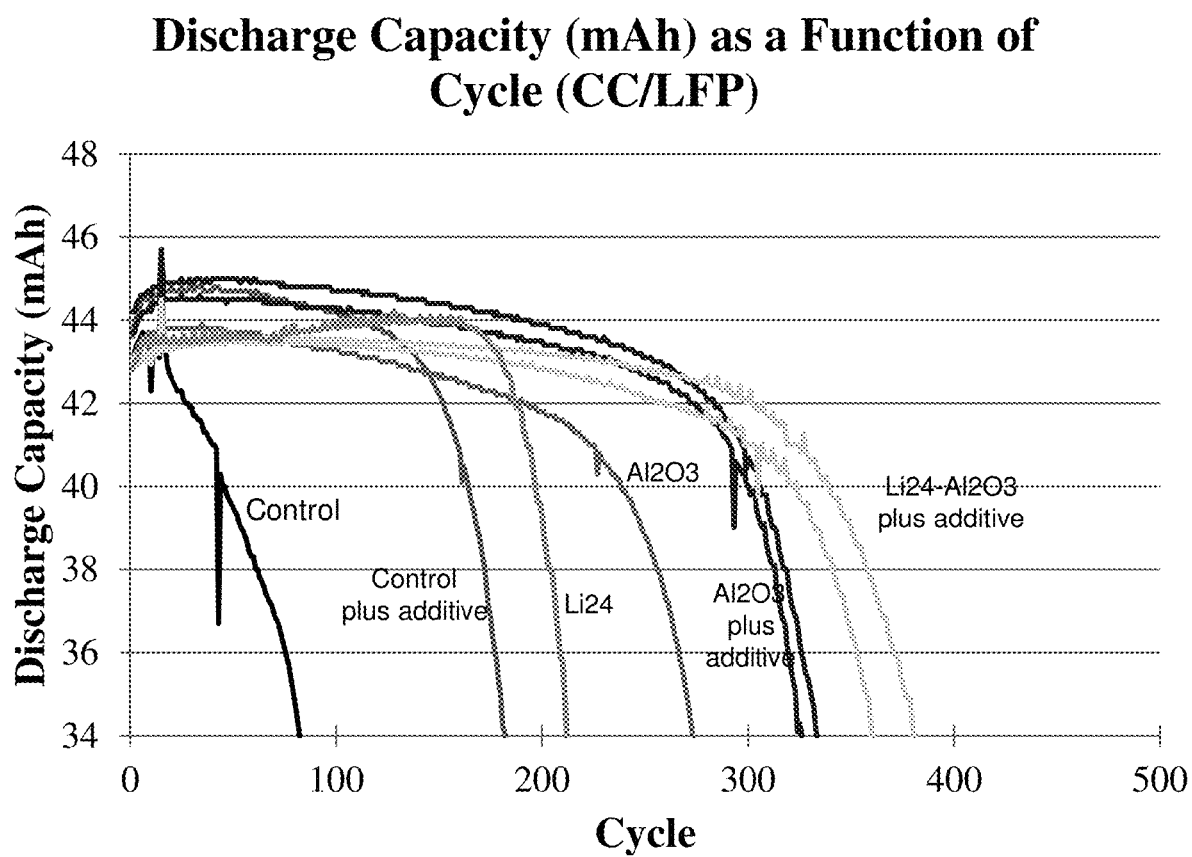
FIG. 12 is a plot of discharge capacity as a function of charge/discharge cycle for several exemplary cathode centered cells, according to certain aspects.
Figure 13A:
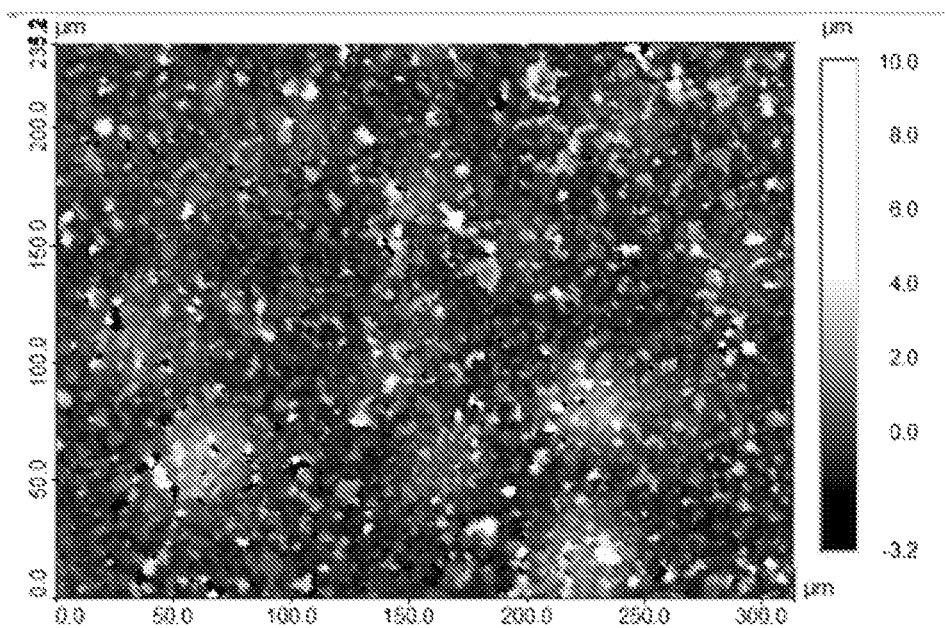
FIG. 13A shows a profilometry plot of a protective layer/resulting deposited layer, according to certain aspects.
Figure 13B:
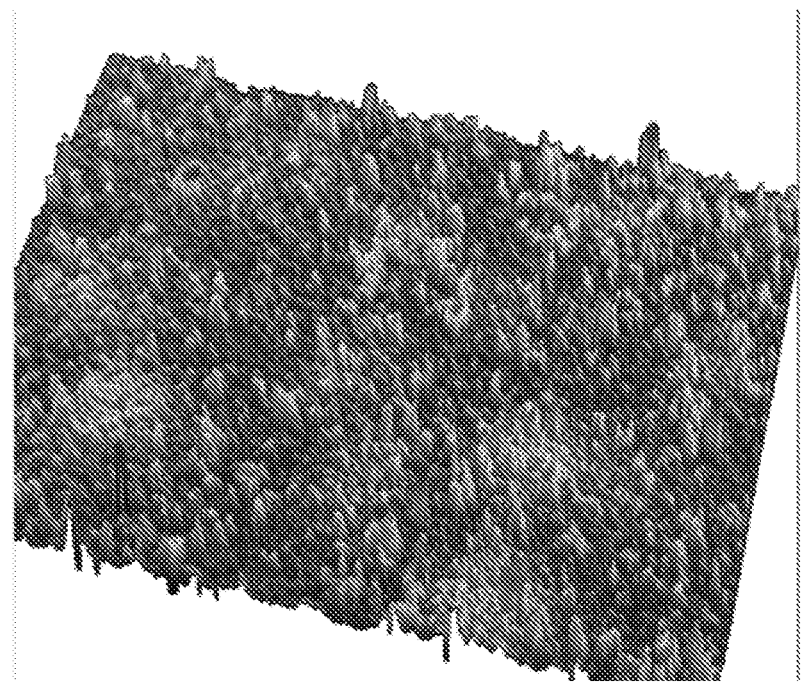
FIG. 13B shows a 3-D profilometry plot of the protective layer/resulting deposited layer in FIG. 13A, according to certain aspects.
Figure 13C:
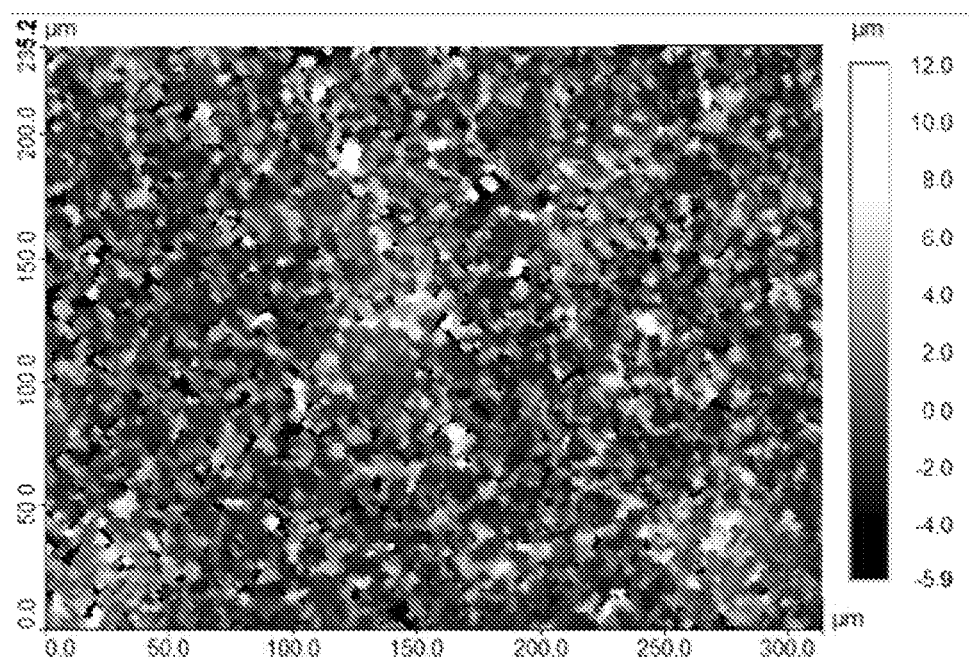
FIG. 13C shows a profilometry plot of a protective layer/resulting deposited layer, according to certain aspects.
Figure 13D:
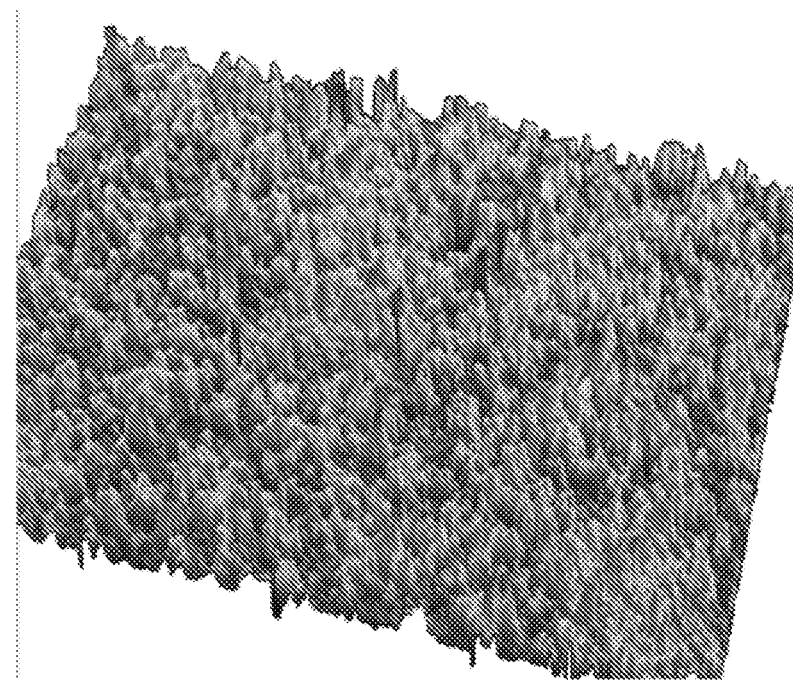
FIG. 13D shows a 3-D profilometry plot of the protective layer/resulting deposited layer in FIG. 13C, according to certain aspects.

Cycling Data:

FIGS. 11 and 12 show the charge/discharge cycling performance of lithium iron phosphate cathode electrochemical cells with a liquid electrolyte including the porous protective layers described herein, as compared to otherwise identical LFP-cathode electrochemical cells without the porous protective layer. FIG. 11 shows the discharge capacity (mAh) of bi-cells comprising a $Li_{24}/Al_2O_3$/PE porous protective layer (as described above) deposited via aerosol deposition on a lithium anode as compared to control cells without the protective layer. Electrochemical cells including the porous protective layer demonstrated a significant increase in cell cycle lifetime (e.g., going beyond 500 charge/discharge cycles without a significant change in discharge capacity) as compared to control electrochemical cells.

FIG. 12 shows the discharge capacity (mAh) of a cathode centered electrochemical cell with a liquid electrolyte including porous protective layers comprising Li24, $Al_2O_3$, or combinations thereof, in the presence or absence of a $LiNO_3$ electrolyte additive (<4 wt % of the total weight of the electrolyte). Electrochemical cells including the porous protective layer demonstrated a significant increase in cell cycle lifetimes (e.g., between 200 and 400 cycles) as compared to control electrochemical cells (e.g., less than 200 cycles). Without wishing to be bound by theory, the incorporation of electrolyte additives created a synergistic effect in terms of cycle performance, and points to the porous nature of the protective layers.

Figure 15A:
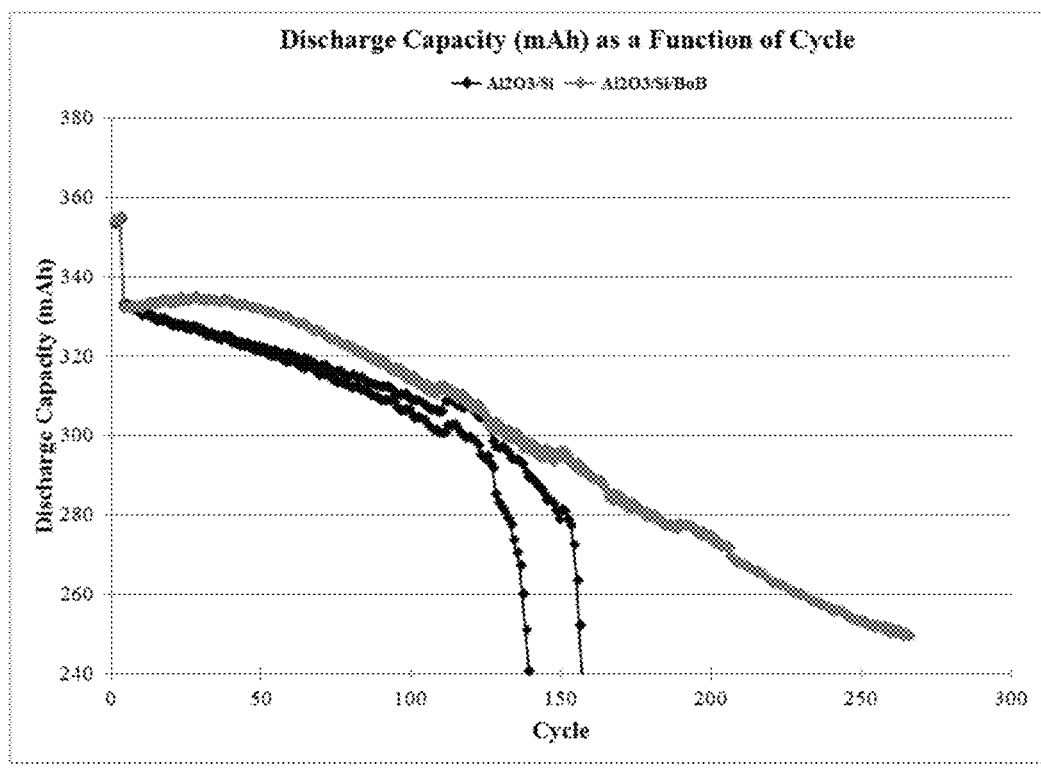
FIG. 15A is a plot of discharge capacity as a function of charge/discharge cycle for several exemplary cathode centered cells, according to certain aspects.

FIG. 15A shows the discharge capacity (mAh) of a cathode centered electrochemical cell including porous protective layers comprising $Al_2O_3$, silica, and lithium bis(oxalate)borate at equal vol %. Electrochemical cells with a liquid electrolyte including this porous protective layer demonstrated a significant increase in cell cycle lifetime (e.g., between 200 and 300 cycles) as compared to control electrochemical cells (e.g., about 150 cycles) that did not include the porous protective layer (all other factors being equal).

Figure 15B:
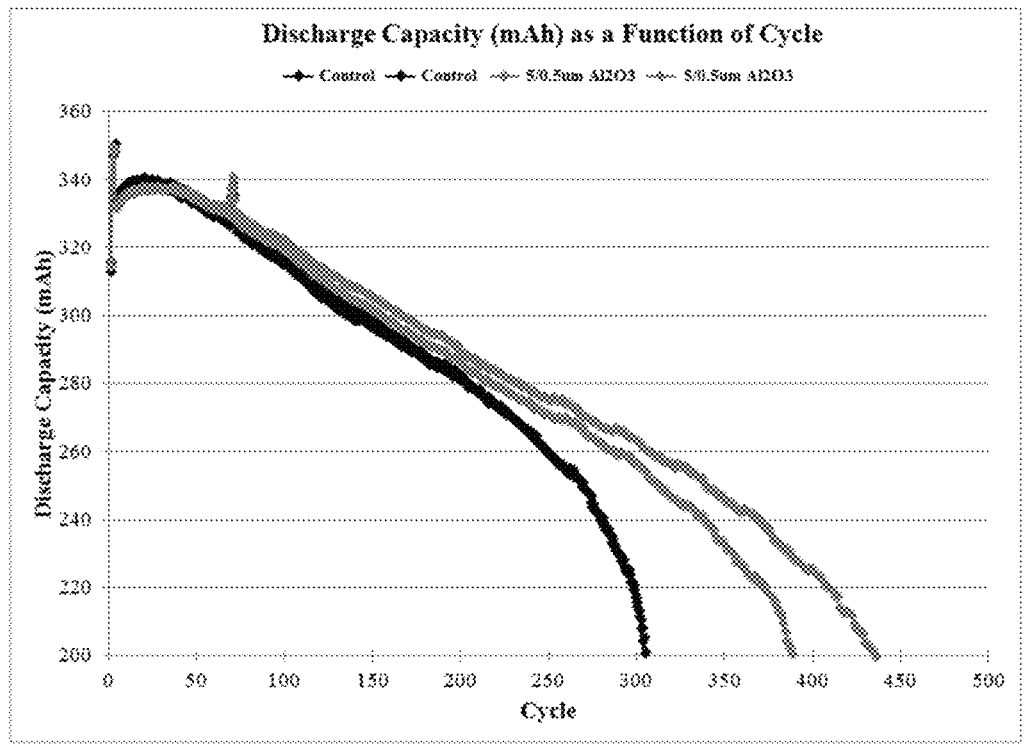
FIG. 15B is a plot of discharge capacity as a function of charge/discharge cycle for several exemplary cathode centered cells, according to certain aspects.

FIG. 15B shows the discharge capacity (mAh) of a cathode centered electrochemical cell including porous protective layers comprising 5 micron $Al_2O_3$ and 0.5 um $Al_2O_3$ at equal vol %. Electrochemical cells with a liquid electrolyte including this porous protective layer demonstrated a significant increase in cell cycle lifetime (e.g., between 350 and 400 cycles) as compared to control electrochemical cells (e.g., about 300 cycles) that did not include the porous protective layer (all other factors being equal).

Figure 15C:
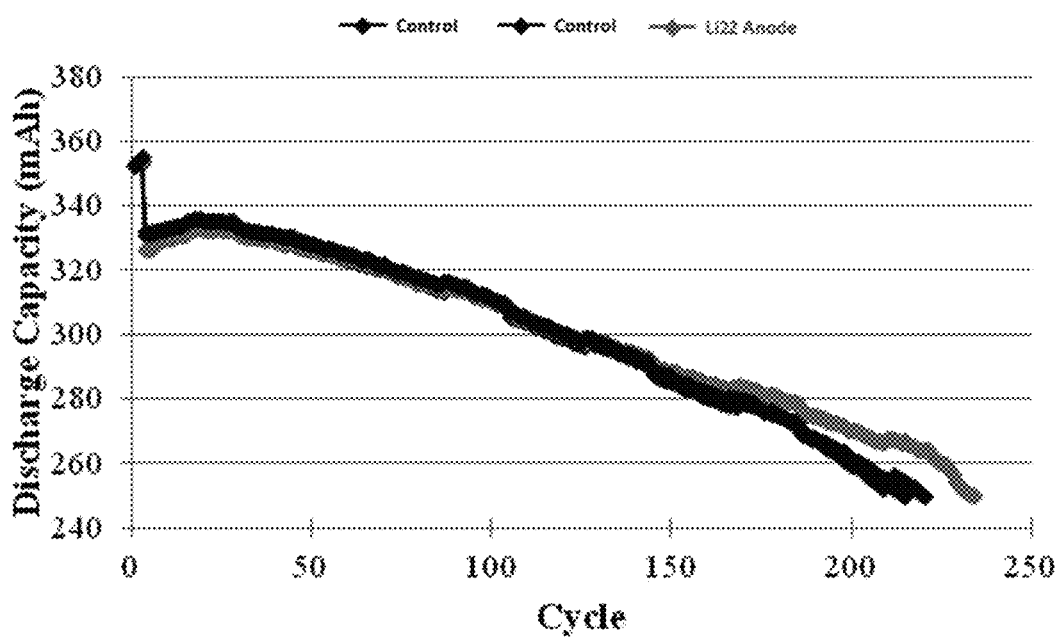
FIG. 15C is a plot of discharge capacity as a function of charge/discharge cycle for several exemplary cathode centered cells, according to certain aspects.

FIG. 15C shows the discharge capacity (mAh) of a cathode centered electrochemical cell including porous protective layers comprising $Li_{22}SiP_2S_{18}$ deposited on a 25 micron thick lithium layer.

Figure 15D:
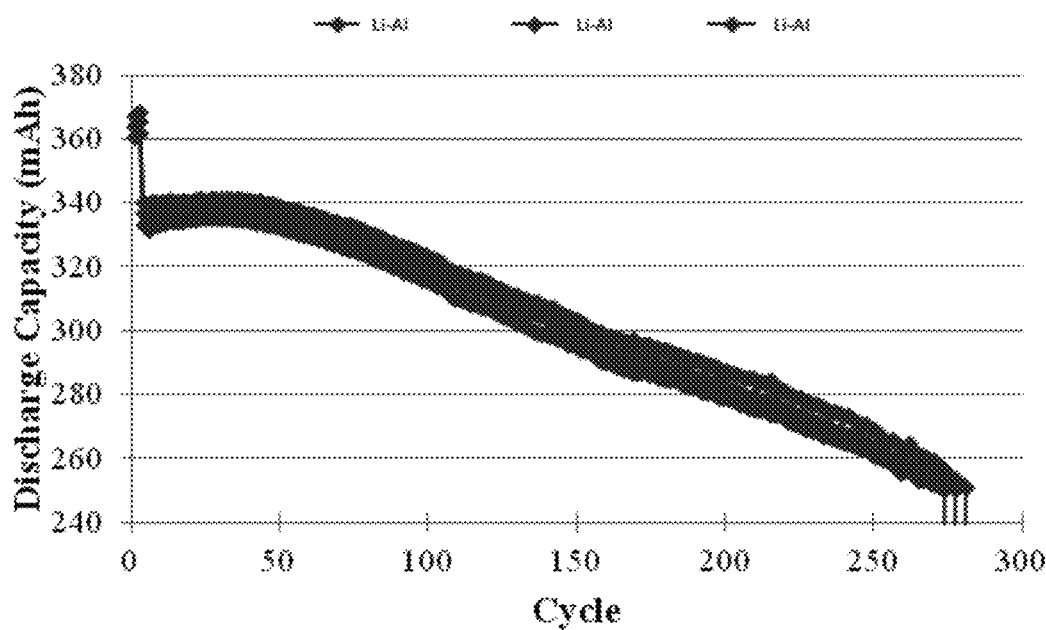
FIG. 15D is a plot of discharge capacity as a function of charge/discharge cycle for several exemplary cathode centered cells, according to certain aspects.

FIG. 15D shows the discharge capacity (mAh) of a cathode centered electrochemical cell including porous protective layers comprising $Li_{22}SiP_2S_{18}$ and $Al_2O_3$ at equal vol %. Electrochemical cells with a liquid electrolyte including this porous protective layer demonstrated an increase in cell cycle lifetime (e.g., between 250 and 300 cycles) as compared to electrochemical cells including porous protective layers comprising $Li_{22}SiP_2S_{18}$ alone (e.g., between 200 and 250 cycles).

Surface Roughness:

FIGS. 13A-13D show profilometry data for Li24/$Al_2O_3$ layers (second layers) deposited via aerosol deposition on lithium (first layer), as described above. The sample coated with a standard nozzle had an $R_z$ value of 11.2 microns. The sample coated with a Laval nozzle had an $R_z$ value of 16.2 microns.

While several aspects of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific aspects of the invention described herein. It is, therefore, to be understood that the foregoing aspects are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one aspect, to A only (optionally including elements other than B); in another aspect, to B only (optionally including elements other than A); in yet another aspect, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one aspect, to at least one, optionally including more than one, A, with no B present (and optionally including elements other than B); in another aspect, to at least one, optionally including more than one, B, with no A present (and optionally including elements other than A); in yet another aspect, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively. The combination of two or more of any aspects of the invention described herein is within the disclosure of the present application.

What is claimed is:

1. An electrochemical cell, comprising:
   a first layer;
   a second layer disposed on the first layer, wherein the second layer is porous and comprises a plurality of particles, wherein the plurality of particles in the second layer are formed from particles having an original surface,
   wherein at least a portion of the plurality of particles comprise a non-ionically conductive material,
   wherein the second layer has an ionic conductivity less than about $10^{-6}$ S/cm,
   wherein at least a portion of the plurality of particles are fused to one another such that at least a portion of the original surface of the particles can no longer be discerned in the plurality of particles fused to one another,
   wherein the second layer has an average thickness between about 0.1 microns and about 5 microns; and
   a liquid electrolyte,
   wherein the second layer is permeable to the liquid electrolyte.

2. An article for use in an electrochemical cell, comprising:
   a first layer comprising lithium metal; and
   a second layer deposited on the first layer, wherein the second layer comprises a plurality of particles, wherein the plurality of particles in the second layer are formed from particles having an original surface, and wherein the second layer is porous, wherein at least a portion of the plurality of particles are at least partially embedded within the lithium metal of the first layer, wherein at least a portion of the plurality of particles are fused to one another such that at least a portion of the original surface of the particles can no longer be discerned in the plurality of particles fused to one another, wherein the second layer has an average thickness between about 0.1 microns and about 5 microns.

3. An electrode, comprising:
a first layer comprising an electroactive layer and a coating, wherein the coating comprises a first material; and
a second layer deposited on the coating of the first layer, wherein the second layer is a protective layer and comprises a plurality of particles formed of a second material, and wherein the plurality of particles in the second layer are formed from particles having an original surface,
wherein the first material has a hardness greater than a hardness of the second material,
wherein at least a portion of the plurality of particles are fused to one another such that at least a portion of the original surface of the particles can no longer be discerned in the plurality of particles fused to one another, and
wherein the second layer has an average thickness between about 0.1 microns and about 5 microns.

4. An electrochemical cell as in claim 1, wherein at least a portion of the plurality of particles are polymeric particles.

5. An electrochemical cell as in claim 1, wherein the non-ionically conductive material comprises a ceramic material.

6. An electrochemical cell as in claim 1, wherein the non-ionically conductive material is present in the second layer in an amount of at least about 20 wt % versus the total second layer composition.

7. An electrochemical cell as in claim 4, wherein the polymeric particles are present in the second layer in an amount of at least about 10 wt % versus the total second layer composition.

8. An electrochemical cell as in claim 1, wherein at least a portion of the surface of the second layer not in contact with the first layer has a surface roughness of greater than or equal to about 0.1 µm.

9. An electrochemical cell as in claim 1, wherein the non-ionically conductive material is present in the second layer in an amount of at least about 80 wt % of the second layer.

10. An electrochemical cell as in claim 1, wherein the plurality of particles have an average largest cross-sectional dimension between about 0.5 microns and about 20 microns.

11. An electrochemical cell as in claim 1, wherein the second layer comprises an ionically conductive material, and wherein the ionically conductive material comprises an inorganic material.

12. An electrochemical cell as in claim 1, wherein the second layer comprises an ionically conductive material, and wherein the ionically-conductive material comprises a ceramic, wherein the ceramic is a $Li_{24}SiP_2S_{19}$.

13. An electrochemical cell as in claim 1, wherein the second layer comprises an ionically conductive material, and wherein at least a portion of the ionically conductive material is crystalline.

14. An electrochemical cell as in claim 1, wherein the second layer has a density of between 1.5 and 6 $g/cm^3$.

15. An electrochemical cell as in claim 1, wherein the second layer has a porosity of at least about 25%.

16. An electrochemical cell as in claim 1, wherein the first layer comprises a polymer.

17. An electrochemical cell as in claim 16, wherein the polymer is a polymer gel or forms polymer gel when exposed to liquid electrolyte.

18. An electrochemical cell as in claim 1, wherein the first layer comprises an electroactive material.

19. An electrochemical cell as in claim 1, wherein the first layer comprises lithium metal.

20. An electrochemical cell as in claim 1, wherein the first layer is a separator.

21. An electrochemical cell as in claim 1, wherein the non-ionically conductive material comprises alumina or silica.

22. An electrochemical cell as in claim 1, wherein the non-ionically conductive material in the second layer has an electronic conductivity of less than about $10^{-10}$ S/cm.

23. An electrochemical cell of claim 1, wherein the first layer comprises a coating of a material on a surface of the first layer.

24. An electrochemical cell of claim 1, wherein the first layer comprises a coating of a non-lithium ion conductive material on a surface of the first layer.

25. An electrochemical cell as in claim 1, wherein particles fused to one another have a minimum cross-sectional dimension of greater than 0.75 microns.

* * * * *